US008435036B2

(12) United States Patent
Wickham et al.

(10) Patent No.: US 8,435,036 B2
(45) Date of Patent: *May 7, 2013

(54) DYNAMIC GASTRIC MODEL

(75) Inventors: Martin Wickham, Norwich (GB); Richard Faulks, Norwich (GB)

(73) Assignee: Plant Bioscience Limited, Norwich, Norfolk (GB)

(*) Notice: Subject to any disclaimer, the term of this patent is extended or adjusted under 35 U.S.C. 154(b) by 0 days.

This patent is subject to a terminal disclaimer.

(21) Appl. No.: 13/234,024

(22) Filed: Sep. 15, 2011

(65) Prior Publication Data

US 2012/0070813 A1   Mar. 22, 2012

Related U.S. Application Data

(63) Continuation of application No. 11/995,062, filed as application No. PCT/GB2006/002661 on Jul. 18, 2006, now Pat. No. 8,092,222.

(30) Foreign Application Priority Data

Jul. 18, 2005   (GB) .................................. 0514702.0

(51) Int. Cl.
    *G09B 19/00*   (2006.01)
(52) U.S. Cl.
    USPC ......................................................... 434/127
(58) Field of Classification Search .................. 434/127, 434/262, 267, 268, 272, 295
    See application file for complete search history.

(56) References Cited

U.S. PATENT DOCUMENTS

| 3,595,530 | A | * | 7/1971 | Hubers .......................... 366/332 |
| 4,207,007 | A | | 6/1980 | Yamschikov et al. |
| 5,525,305 | A | * | 6/1996 | Minekus et al. ............... 422/111 |
| 5,993,406 | A | | 11/1999 | Rozga et al. |
| 6,022,733 | A | | 2/2000 | Tam et al. |
| 6,379,619 | B1 | * | 4/2002 | Rozga et al. ..................... 422/48 |
| 6,551,108 | B1 | | 4/2003 | Weinspach |
| 7,611,630 | B2 | | 11/2009 | Babcock et al. |
| 2005/0214727 | A1 | | 9/2005 | Stoianovici et al. |

FOREIGN PATENT DOCUMENTS

| DE | 19855121 | 5/2000 |
| JP | 09-231617 | 3/1999 |
| WO | 2004014534 | 2/2004 |

OTHER PUBLICATIONS

Blanquet et al., "Recombinant *Saccharomyces cerevisiae* expressing P450 in artificial digestive systems: a model for biodetoxication in the human digestive environment," Appl Environ Microbiol, May 2003.
Turck, "Experiments in gastric digestion," Jour AMA, Jun. 1899.

(Continued)

*Primary Examiner* — Kurt Fernstrom
(74) *Attorney, Agent, or Firm* — Andrus, Sceales, Starke & Sawall, LLP

(57) ABSTRACT

This invention provides an apparatus for simulating digestion of a foodstuff, which apparatus comprises:

Figure 1A:
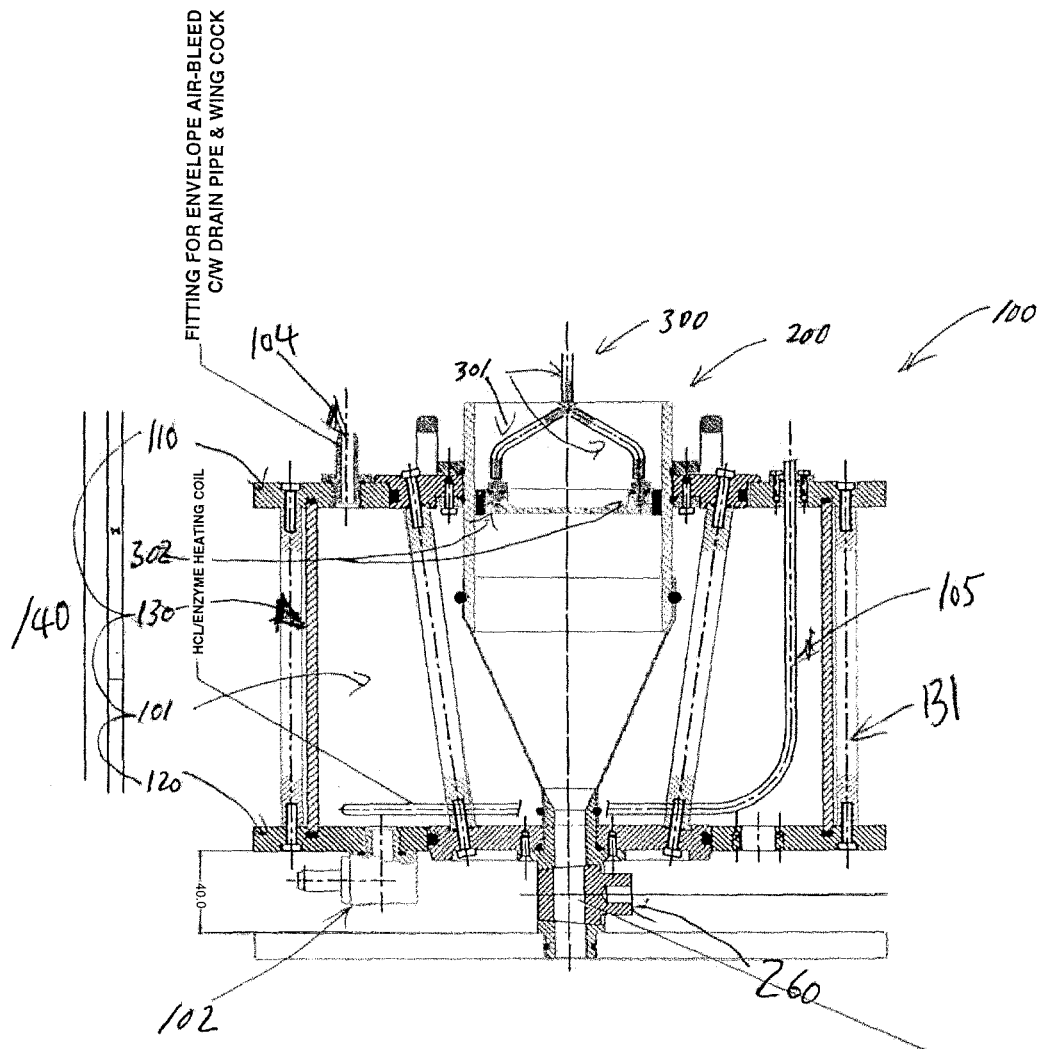

(a) an outer containment vessel into which fluid can be introduced and removed via at least one orifice, and (b) an inner digestion chamber comprising a rigid portion through which the foodstuff can be introduced and a flexible portion which tapers from the rigid portion to an aperture from which the foodstuff can be removed, wherein said inner chamber is securable within the outer vessel such that reversible alteration of fluid pressure within the outer vessel causes reversible partial compression of the flexible portion for mixing foodstuff present therein. The invention also provides systems and methods for simulating digestion of a foodstuff.

27 Claims, 22 Drawing Sheets

OTHER PUBLICATIONS

Mirizzi et al., "Model to simulate the gastric electrical control and response activity on the stomach wall and on the abdominal surface," Med Biol Eng Comput, Mar. 1986.

Arnold et al., "In vitro studies of intragastric digestion," Dig Dis Sci., Aug. 1983.

Institute of Food Research, "Introductory Exploitation Platforms," Science and Innovation, Issue 2:05 (2005) (ifr.ac.uk) p. 2.

International Search Report and Written Opinion for Application No. PCT/GB2006/002661 dated Dec. 11, 2006 (17 pages).

* cited by examiner

Stage 1 – pH Monitoring and control

Stage 1 – Temperature monitoring and control

Stage 1 –Enzyme control

Stage 1 – Pulsed squeeze control

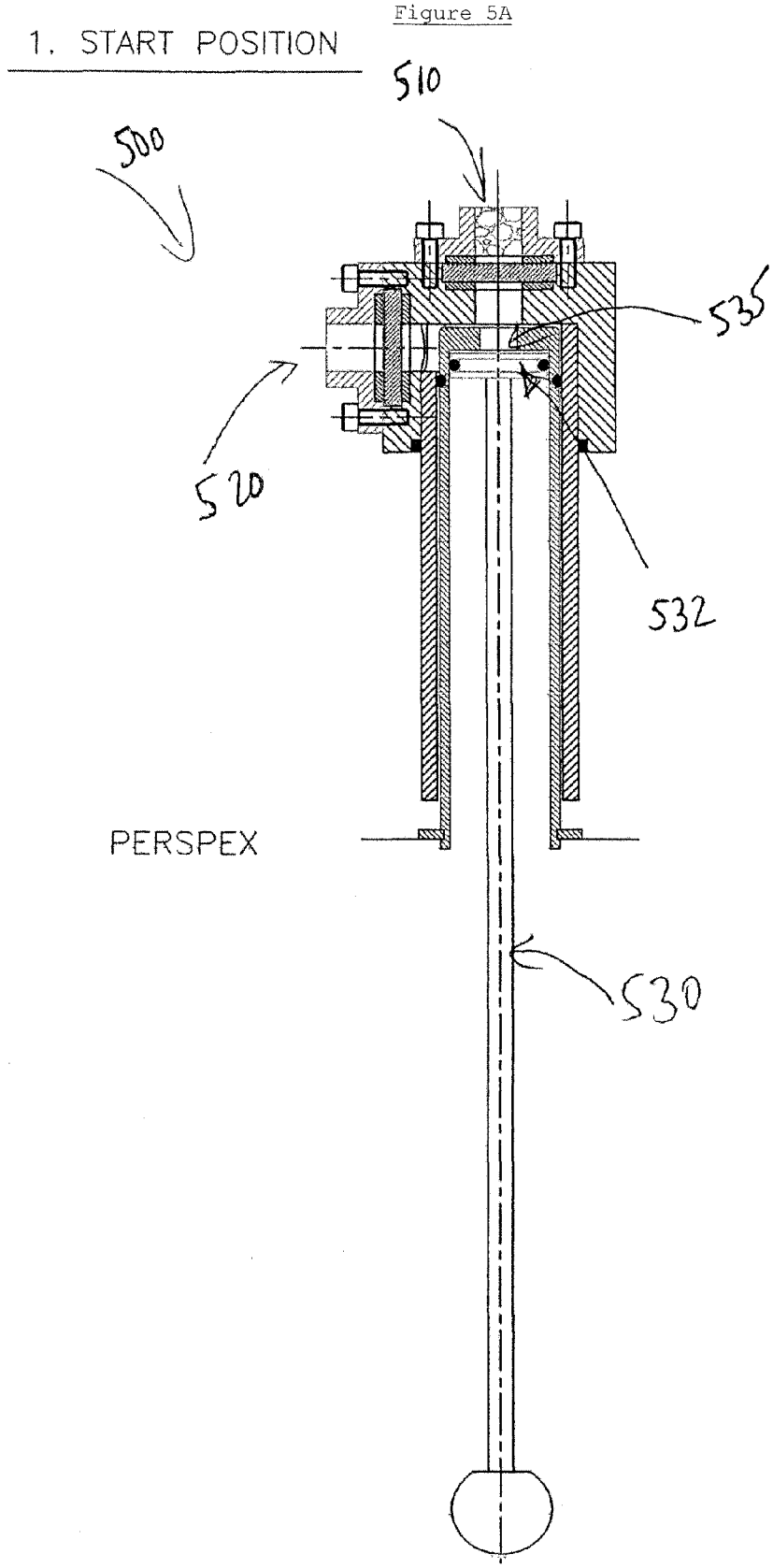

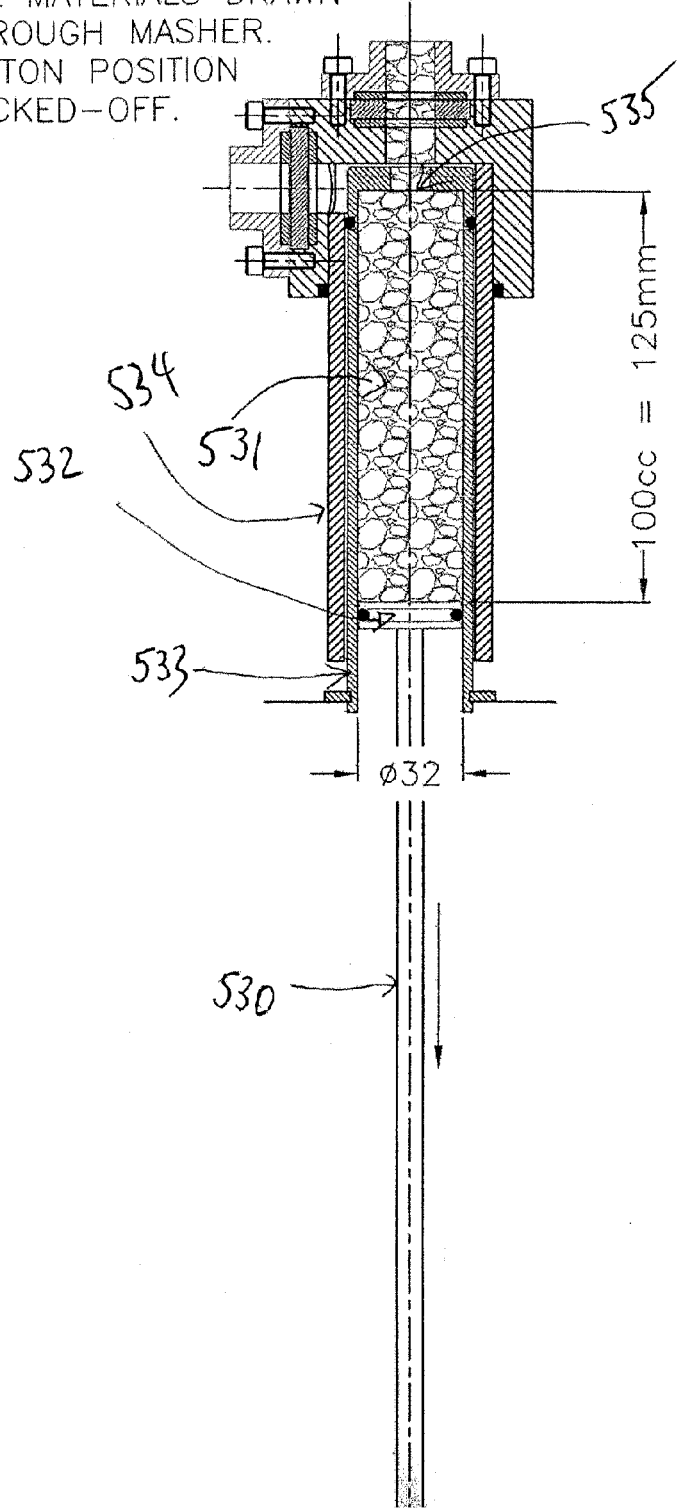

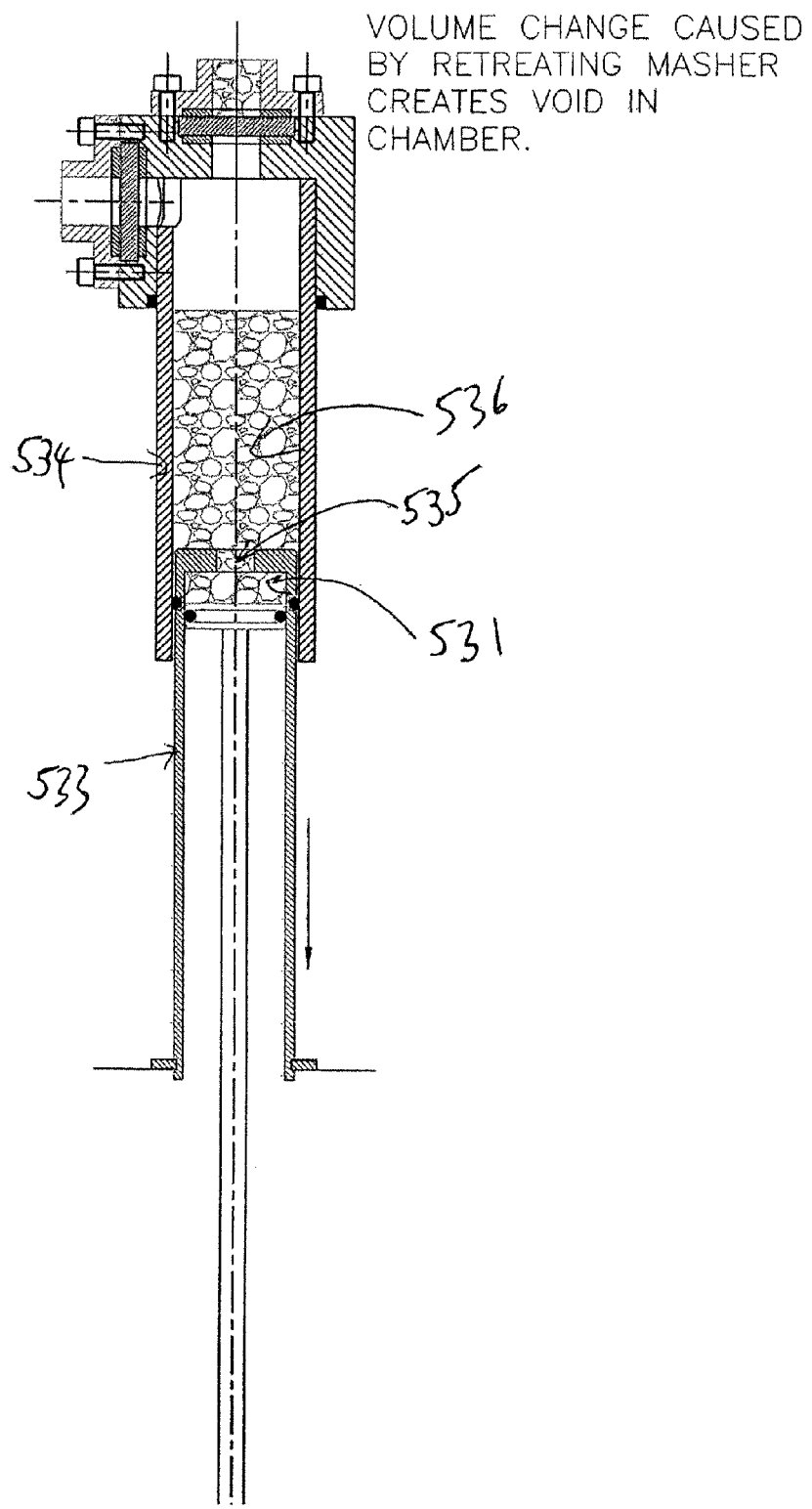

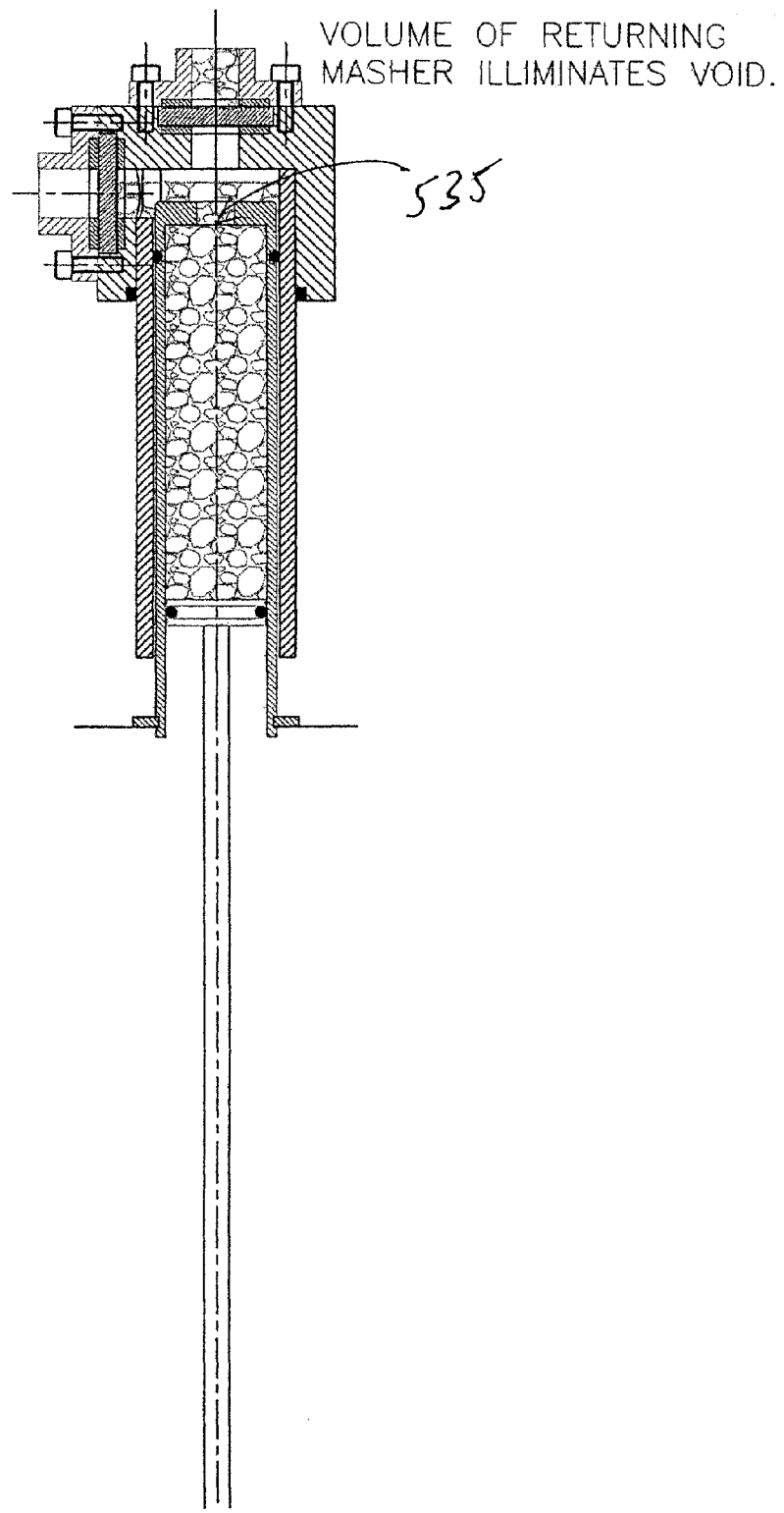

DYNAMIC GASTRIC MODEL

CROSS REFERENCE TO RELATED APPLICATIONS

This patent application is a continuation of U.S. patent application Ser. No. 11/995,062, filed Jan. 30, 2008, now U.S. Pat. No. 8,092,222, which is a national stage application under 35 U.S.C. 371 of International Application No. PCT/GB2006/002661, filed on Jul. 18, 2006, which claims priority benefits to Great Britain Patent Application No. 0514702.0, filed Jul. 18, 2005.

TECHNICAL FIELD

This invention relates generally to an apparatus and systems for simulating digestion and methods for using the same, for example for physiologically relevant investigations into food and pharmaceutical digestion by vertebrates using real foods and pharmaceutical preparations.

BACKGROUND ART

While humans have achieved the seemingly impossible feat of putting humans into outer space and on the moon, there remains an incredible lack of information on the most basic of all functions—ingestion and digestion of foodstuffs. How the alimentary canal achieves the critical life-perpetuating function of receiving whole food-stuffs, the physico-chemical process by which critical nutrients are extracted, and excess or unnecessary components are eliminated, is understood very well in some respects, and very poorly in other respects. The general addition of various chemicals at various stages of the digestive process and the extraction of certain nutrients has been studied extensively. However, the models available for the actual physical manipulation of food-stuffs remain relatively crude.

Some of the most sophisticated models that are available to date include that described in U.S. Pat. No. 5,525,305, issued on Jun. 11, 1996, for an "In Vitro Model of an In Vivo Digestive Tract". In that model, a relevant set of questions may be asked with respect to the digestive process as applied to a relatively limited subset of test foodstuffs. The system consists essentially of at least one unit including at least two pressure chambers into which a fluid may be introduced, passed back and forth between the two pressure chambers, into which may be added various chemicals, enzymes, and pH modulators.

U.S. Pat. No. 6,022,733, issued on Feb. 8, 2000, relates to a "Simulated Biological Dissolution and Absorption System", including a cell monolayer in contact with a medium in which pharmaceutical formulations may be dissolved, and analyzed, and an effluent from said cell monolayer to permit analysis of uptake of the dissolved pharmaceutical composition.

U.S. Pat. No. 6,379,619, issued Apr. 30, 2002, relates to an "Artificial Gut", which includes a series of hollow fibers lined with selected biological components, including enterocytes, and perfusing the series of hollow fibers thus coated with biological components, including under oxygenation.

In none of these systems is there a concerted focus on the actual physical forces and handling of the materials introduced to ensure that, as much as possible, the system reflects actual physiological processes, from both a chemical point of view, but also a mechanical perspective. Accordingly, it is believed that there remains a long felt need for a system that incorporates these parameters, which may be used in conjunction with or to supersede the systems already known in the art, including but not limited to those mentioned above, for seeking to model digestion of foods, pharmaceuticals, and specific nutrients.

A brief discussion of a "model gut" devised by the present inventors was made in "Science and Innovation" Issue 2:05 released by the Institute of Food Research, Norwich, UK (www.ifr.ac.uk). However that discussion did not teach or suggest the structure of the model gut.

Thus it can be seen that the disclosure of novel apparatus, systems and methods for improved simulation of digestion would provide a contribution to the art.

SUMMARY OF THE INVENTION

Novel apparatus, systems and methods are provided which incorporate physical, mechanical and biochemical environments elucidated to exist in the in vivo lumen of the vertebrate digestive tract.

In preferred embodiments the system includes an holistic stomach and, preferably, at least a portion of the small intestine, capable of handling complex foods, real meals and pharmaceutical preparations.

Thus the model may include at least three distinct stages of very different physical and environmental conditions, as reflected by state of the art investigation into the operation of the human gut during different stages of meal processing.

Stage 1 simulates the main body of the stomach (the upper part of the stomach), a region with inhomogeneous mixing behaviour, distinct acid and enzyme additions and a unique, physiologically relevant emptying routine into Stage Two. This may be provided by (a) an outer containment vessel into which fluid can be introduced and removed via at least one orifice, and (b) an inner digestion chamber comprising a rigid portion through which the foodstuff can be introduced and a flexible portion which tapers from the rigid portion to an aperture from which the foodstuff can be removed, wherein said inner chamber is securable within the outer vessel such that reversible alteration of fluid pressure within the outer vessel causes reversible partial compression of the flexible portion for mixing foodstuff present therein.

Stage 2 simulates the antrum (the lower part of the stomach), where the digesta from Stage 1 is subjected to physiologically relevant shear forces to break down the food structure, prior to emptying into Stage 3. Stage 2 may be provided by:

(a) an outer cylinder including in a first end wall an entry port through which the foodstuff can be introduced, and at the opposite second end an opening for receiving an inner cylinder, and in the side wall proximal to the first end wall an exit port from which the foodstuff can be removed, (b) an inner cylinder slidably mounted within the outer cylinder and including in a first end wall an aperture through which the foodstuff can be reversibly forced between the inner and outer cylinders, and at the opposite second end an opening for receiving a plunger, (c) a plunger slidably mounted within the inner cylinder for drawing the foodstuff through the entry port and aperture into the inner cylinder, wherein the aperture is within a resilient diaphragm secured within the end wall of the inner cylinder, and wherein the volume of the inner cylinder is between 20 and 200 ml Stage 3 simulates conditions found in the duodenum (the first section of the small intestine).

Novel systems and methods are also provided which combinations of stages and/or steps further provide for improved modelling of in vivo digestion.

Preferably the stages described above may be in modular form and may be integrated together to provide model gut systems according to the invention. Preferably the systems may be computer controlled, for example by software running on a computer system, and monitoring of all parts of the systems may be performed in real time.

DETAILED DISCLOSURE OF PREFERRED EMBODIMENTS

In developing the apparatus, systems and methods according to this invention, the present inventors have been mindful to develop and incorporate state of the art scientific information relevant to the in vivo vertebrate, including but not limited to, human digestion of real foodstuffs. Thus, the inventors have undertaken magnetic resonance imaging (MRI), and specifically, Echo Planar Imaging (EPI), studies in human volunteers during the digestive process. The inventors observed meals within the body of the stomach and discovered that the stomach pulses gently after ingestion of a meal, resulting in only mild mixing. It was noted that gastric secretions released from the stomach wall during this phase penetrate into the meal bolus by only a few millimeters around the outer surface, following which a sloughing of the now hydrated outer surface of the bolus occurs. The "sloughate" is emptied into the antrum. It was found that this secretion, diffusion and sloughing cycle reiterates until the entire meal bolus is cleared from the body of the stomach. Thus, Stage 1 of the present system incorporates this physiological process, by providing a flexible vessel of appropriate geometry. Preferably, a non-porous, easily cleaned, oil, water, acid and enzyme resistant (at physiological temperatures) and robust material is selected for mimicking the walls of the body of the stomach. Ideally, the material is also permissive of MRI, such that direct comparison of MRI images of 'digestion' in this stage of the model with MRI images obtained in vivo is facilitated.

Appropriate materials and construction geometries include those shown in the figures and equivalents thereof. For example, therefore, for Stage 1, the main body of the stomach, the outer digestion vessel and non flexible components of the inner digestion chamber are preferably constructed from Perspex. The flexible part of the inner digestion chamber is preferably constructed from polyurethane. All o-rings are preferably nitrile rubber and the screws and bolts are preferably nylon. All other parts of this stage of the model are preferably constructed from Delrin. Where compatibility with MRI is not required, naturally, other materials including metal, such as stainless steel, titanium, and the like, may be used for the rigid portions of the apparatus. Flexible portions of the apparatus may likewise be constructed from latex or other appropriate materials.

Pre-Stage 1 Treatment of Material—Mastication of Foodstuffs.

To ensure reproducibility in size reduction of food material prior to processing at stage 1 (the model of the main body of the stomach) a precision cutting device was designed. This apparatus was used to produce material resulting from a 'standard chew' within the bucal cavity of vertebrates prior to simulated digestions within the stomach and small intestines. The designed piece of apparatus cuts food material into cubes of approximately 3 $mm^2$ dimensions, representing the approximate size of food produced by human chewing prior to swallowing. The apparatus consists of double-edged razor blades aligned 3 mm apart on a metal frame. The apparatus is used to first cut 3 mm wide strips from food material and then turned 90° to cut these strips into cubes. The resulting cubes are pushed out of the device by a pivoted array of rods. Once cut, the food material is subjected to low levels of α-amylase "digestion" at 37° C. for a period of time ranging between 10-60 seconds. This pre-treatment technology optionally further includes a mechanical crushing/breakdown of the food material/structure with parallel addition and mixing of a 'model saliva' (aqueous mix of mucins and digestive enzymes). This pre-treated food material is then fed into Stage 1, a simulation of the main body of the stomach.

Stage 1—the Main Body of the Stomach

Thus the invention provides an apparatus for simulating digestion of a foodstuff, which apparatus comprises:
(a) an outer containment vessel into which fluid can be introduced and removed via at least one orifice, and
(b) an inner digestion chamber comprising a rigid portion through which the foodstuff can be introduced and a flexible portion which tapers from the rigid portion to an aperture from which the foodstuff can be removed
wherein said inner chamber is securable within the outer vessel such that reversible alteration of fluid pressure within the outer vessel causes reversible partial compression of the flexible portion for mixing foodstuff present therein.

The foodstuff can be any material which it is desired to model the digestion of, including complex foods, real meals or model meals, pharmaceutical or nutraceutical preparations or formulae including slow release formulations. Optionally the food-stuff used in the process may include added active materials (e.g. pro- or pre-biotics; pathogenic or non-pathogenic bacteria etc.) which it is desired to study within the in vitro system.

Typically the volume of the inner chamber is between 500 and 1000 ml.

Preferably the rigid portion is annular and the flexible portion is conical or frustoconical and is connected at its upper extremity to the rigid portion and at its lower extremity to a resilient annular member which is of smaller diameter than the rigid annular portion and which defines the aperture.

The flexible portion may comprise a moulded flexible sheet material secured around each of the rigid annular portion and the resilient annular member by an O-ring.

The mixing achieved by Stage 1 of the apparatus is inhomogeneous mixing. The gentle pulsing produced by the addition and removal of fluid from the outer containment vessel facilitates the penetration of digestive additives (which correspond to gastric secretions) into the peripheral of the foodstuff bolus.

Preferably the apparatus further comprises a valve for controlling flow from the aperture in the resilient annular member. The novel structure of part-flexible, part-rigid inner digestion vessel and the continued pulsing produced by the outer chamber will result in the preferential emptying of the now hydrated outer region of the foodstuff bolus through the aperture when the isolating valve between Stage 1 and Stage 2 is opened. This sequence of events will repeat until Stage 1 is empty resulting in a continued cycle of hydration around the outside of the foodstuff bolus followed by preferential emptying of this now hydrated portion (an 'onion pealing' effect).

Thus the invention provides the ability to accurately mimic both the biochemical and physical processes of dilution and mixing of meals within the stomach. Contrary to the traditional idea of rapid and complete homogenization of a meal within the main body of the stomach, gastric contents appear to be rather poorly mixed. Long after ingestion the meal remains heterogeneous, with gastric secretions only penetrating around the outside of the food bolus. MRI investigation suggest that the centre of the meal bolus is not diluted by secretions for an appreciable time. The data also suggested that the stomach selectively emptied into the tower part of the stomach (the antrum) the more dilute, peripheral components of the meal bolus, which are closest to the contractile activity. This suggests that food leaves the bolus by a process of elution.

The inner chamber may be held within a cassette which can be demountably secured within the outer vessel, for example to facilitate removal for cleaning or decontamination purposes. Thus the outer vessel may comprise a top plate, a bottom plate, an annular chamber wall extending between and sealingly affixed to each of said top plate and said bottom plate wherein apertures in said top plate in said bottom plate permit the cassette to be demountably secured therein. Preferably the cassette comprises a top sealable plate rigidly disposed apart from a bottom sealable plate, each of which respectively sealably mate to an aperture in said top plate and an aperture in said bottom plate of said containment means, wherein the rigid portion of the inner chamber is sealably mounted within the top sealable plate of the cassette.

All structural components are preferably composed of materials which permit real-time MRI, echo-planar MRI, or other on-line monitoring and analysis of ongoing processes to occur. Such materials include, but are not limited to, Delrin for rigid structural components, and polyurethane for pliable components. Preferably all or part of the inner chamber and outer vessel are composed of a material permissive of MRI such that any foodstuff within the inner chamber can be visualised using MRI In use, to simulate the gentle mixing and squeezing of foodstuffs introduced into the body of the stomach, a "simulated stomach" according to this invention comprises a sealed outer containment vessel, and an inner digestion chamber contained within the outer containment vessel. The outer containment vessel is filled completely with a fluid, including but not limited to water. A known, controlled quantity of water is introduced into and cyclically removed from this containment vessel at a definable and controllable rate, which creates a gentle squeezing and relaxing ('massaging') of the flexible part of the inner digestion chamber. In one embodiment of this invention, a pneumatic actuator, a stepper motor to drive the actuator and an intelligent controller are coupled to control the introduction and removal of fluid from the containment vessel.

Preferably the inner chamber has a plurality of pH electrodes disposed within it, wherein each pH electrode optionally contains its own reference electrode. In addition to simulating the mechanical mixing that occurs in the body of the stomach in vivo, the apparatus of this invention this provides online monitoring of the mixing of digesta within the stomach. Acid diffusion and resulting pH changes can be monitored by the series of pH electrodes (FIG. 4), designed and positioned to minimally interfere with mixing, distributed throughout the inner digestion chamber. Preferably, the electrodes are small, soft and robust enough to sustain the physical and chemical environment to which they are exposed. Due to inhomogeneous mixing in the body of the stomach, both pH and diffusion gradients are measured throughout the body of the meal. Accordingly, each pH electrode preferably contains its own reference electrode. Each electrode is preferably interfaced with a central processing unit, such as a personal computer, to permit simultaneous monitoring of all electrodes in real time and control of the rate of delivery of hydrochloric acid to the digestion chamber as shown in FIG. 4.

Preferably the inner chamber includes an applicator for introducing digestive additives from respective digestive additive reservoirs, wherein the applicator is optionally arranged within the inner chamber so as to float upon any foodstuff present therein and deliver said digestive additives onto the interior walls of said inner chamber and\or the foodstuff. The additives may be conducted from the reservoirs to the applicator by hoses passing through the outer vessel such that the temperatures of the additives are modified by fluid in the outer vessel. The additives will generally be one or more of add, alkali, enzymes (particularly digestive enzymes, which are well known to those skilled in the art). Other additives may include phospholipids and bile. Acid and enzymes will typically be stored in temperature controlled reservoirs. The acid reservoir is held at room temperature whereas the reservoirs containing the enzymes are held at between 1-4° C. Both the acid and the enzymes are drawn with the use of computer controlled peristaltic pumps from their respecting storage reservoirs through narrow bore silicone rubber hoses. The rate of enzyme and acid additions are controlled and monitored in real time by appropriate process control software (FIG. 4). The hoses carrying the additions are looped into the main containment vessel where the acid and enzymes contained within the hoses are rapidly warmed from their native temperatures to 37° C. The hoses then feed into a device that floats on top of the meal contained within the digestion chamber. This device rises and falls with the movement of the meal within the digestion chamber. The acid and enzymes are deposited from their respective hoses into this device where they are mixed and then evenly secreted on top of the meal around the wall of the digestion chamber. The rate at which the acid is secreted onto the meal within the digestion chamber is controlled via a feedback mechanism as shown in FIG. 4.

As noted above, the pH at specific points within the digestion chamber is measured with the use of pH electrodes as described previously. These pH electrodes may be interfaced with a central processing unit. Software is implemented that relates measured pH with the rate and amount of acid added into the digestion chamber. The software, in real time, measures pH, calculates required acid and then controls the peristaltic acid pump and hence the rate and amount of acid delivered to the digestion chamber. This system is discussed in more detail below.

Preferably the outer vessel has at least one temperature sensor within it. Temperature throughout the simulation of the main body of the stomach is controlled via an external temperature controller. This temperature controller heats and circulates the fluid contained within the outer containment vessel. Thermocouples or like temperature sensors are positioned throughout the containment vessel and on the outside of the flexible portion of the digestion chamber. These temperature sensors are connected to a central processing unit that monitors the measured values in real time. The temperature output of the temperature controller is then adjusted by the central processing unit (FIG. 4) to ensure the temperature of the fluid circulated within the containment vessel is maintained at pre-determined desired values during processing With reference to FIG. 1A, there is provided a schematic representation of one embodiment of the main body of the stomach portion of an apparatus according to the present invention. This portion of the apparatus is represented in left-to-right cross-section, as a chamber 100, comprising a top plate 110, a bottom plate 120, an annular chamber wall 130 extending between and sealingly affixed to each of said top plate 110 and said bottom plate 120 to create a closed compartment volume 101. Said closed compartment volume 101 defined between said top plate 110, said bottom plate 120 and said annular chamber wall 130 represents a first structural element 140 shown in isolation in FIG. 2A, as a side cross sectional view, and FIG. 2B, as a top cross-sectional view. Said structural element 140 is a sealed compartment, forming a containment means for various ports for mass transport into and out of said compartment volume 101 through said top plate 110 and said bottom plate 120. Affixing said top plate 110 to said bottom plate 120 and clamping said annular chamber wall 130 therebetween, are provided a series of support rods 131 fixed between the underside of said top plate 110 and the topside of said bottom plate 120.

Primary to the function of this aspect of the invention is a removable cassette 200 which is detachably and sealably inserted into and removed from said structural element 140 via apertures 111 in said top plate 110 and 121 in said bottom plate 120. Said removable cassette 200 is shown in isolated cross-sectional detail in FIG. 3A. This preferably detachable cassette 200 defines the internal working volume, in which initial processing of foodstuffs occurs, by analogy to a vertebrate, and in a preferred embodiment, human, stomach. Said cassette 200 shown in FIG. 3A comprises a top sealable plate 210 and a bottom sealable plate 220 each of which respectively sealably mate to said aperture 111 in said top plate 110 and said aperture 121 in said bottom plate 120 of said containment means 140. Gaskets 211 and 221 are provided at the mating edge of said top plate 210 where it meets said aperture 111 and the edge of said lower plate 220 where it meets the said aperture 121. Handles 212 are provided affixed to said top plate 210 to facilitate transport of said cassette. Retaining clips lock said cassette insert into place within said chamber 200. Keeping said top plate 210 and said bottom plate 220 rigidly spaced apart are a series of rods 230. These rods 230 while rigidly maintaining said top plate 210 and said bottom plate 220 in spaced apart relationship to each other, provide open-access to structures disposed between said top plate 210 and said bottom plate 220 and spatially, within a circumference circumscribing said rigid rods 230. In this manner, fluid pressure, air pressure, or the like, and changes thereof within said volume 101 are not impeded by said rods 230 in the way that a solid annulus, such as 130 employed for defining the chamber 140 would do. Of course, rather than the rods 230, an annulus similar to 130 could be used, wherein a plurality of holes in the walls thereof could permit transmission of fluid pressure and changes thereof to the volume included within the circumference of said annulus. Other equivalent variations achieving the function of rigidly spacing said top plate 210 and said bottom plate 220 while permitting transmission of fluid pressures and variations thereof may be utilized for this purpose.

As a part of said cassette 200, there is provided an annular structure 240 for receiving foodstuffs for analysis and processing according to the invention. Said annular structure 240 is sealably affixed within an orifice 241 in said upper plate 210. Sealably affixed to the lower extremity of said annular structure 240 is a pliable membrane 250, affixed via gasket 251, or by equivalent means known in the art, including, but not limited to, for example, crimping wire, a screw-clamp, or the like. Said pliable membrane 250 is affixed at its lower extremity to the upper extremity of a valve structure 260, via gasket 252. Said valve structure 260 is rigidly and sealably affixed through an orifice in said lower plate 220. Said valve structure may be manually actuated or it may be under computer control for regulating passage of mass there through. Preferably, the pliable membrane 250 tapers from the lower extremity of said annular structure 240 toward its own terminus affixed to said valve structure 260. In this way, a volume 242 is defined by the internal space confined by the inside of said annular structure 240 and said tapered pliable membrane 250. Foodstuff is included within the volume 242 to which is added metered, known quantities of selected additives, including but not limited to digestive enzymes, adds, bases and the like. Thus, for example, lipases, dilute hydrochloric acid and the like, may be added to the foodstuff included within said volume 242. As the food thus included and treated is broken down, the "digests" thus produced is permitted to traverse via said valve structure 260 into the next discrete digestive compartment of the model digestive system.

From the foregoing, it will be appreciated that the main body of the stomach is composed of the element 100 in combination with the element 200. It will also be appreciated by those skilled in the art that enhancements in the physiological relevance of this apparatus may be achieved by, for example, collagen coating of surfaces brought into contact with foodstuff. Furthermore, such surfaces may be seeded as a growth surface for endothelial cells, fibroblasts, or the like, as appropriate, depending on the degree to which it is desired to mimic the physiologic milieu encountered by foodstuffs in vivo. It should be borne in mind, however, that enhancements of this nature, while coming within the scope of the invention contemplated herein, will significantly increase the maintenance and care needed to maintain the apparatus in proper working order. It will also be appreciated that, in the first instance, where simulation of physical and chemical processing of foodstuffs is desired, such an exquisite degree of physiologic mimicry may not be necessary or even desirable.

Because data obtained, as discussed herein above, utilizing in vivo MRI, echo-planar MRI, and the like, indicates that food is digested from the outside inward, enzymes, acids, bases, and the like are added to the outside of a bolus of foodstuff included in said volume 242. This is accomplished via applicator 300 comprising hoses 301 through which enzymes, acids, bases and the like are transmitted to nozzles 302 which deliver said enzymes, acids, bases and the like to the periphery of said annular structure 240 by secreting a fine stream of these materials onto the interior walls of said annular structure 240 as well as onto the exterior surface of the foodstuff included in said volume 242. The applicator 300 floats on top of the volume 242 as it delivers enzymes, acids, bases moving both up and down as the level of volume 242 changes, thereby achieving a uniform delivery of these digestive components to the exterior of the foodstuff within the volume 242. To gently mimic what has been observed via in vivo MRI utilizing echo-planar MRI, a liquid, such as water, is introduced and removed rhythmically, into and out of the volume 101 once the cassette 200 containing the foodstuff has been locked into place in orifices 111 and 121 within said chamber 100. As fluid is introduced and removed, a gentle massaging of the flexible membrane 250 is induced, which assists in admixture of added digestive components with the exterior layers of the foodstuff, as well as inducing gentle sloughing of layers of the foodstuff toward said valve mechanism 260, ready for passage into the next phase of the simulated digestive tract. Fluid is added to and removed from the volume 101 by means of fluid addition and removal ports 102 and 103. To bleed the volume 101 of air, an air bleed port 104 is provided. To permit regulation of the temperature of the enzymes, acids, and bases in hoses 301 prior to addition to volume 242 hoses 301 are looped 105 into and immersed in volume 101. The temperature regulation, rate of fluid ingress and egress via ports 102 and 103, rate and composition of mass addition via applicator 300 and nozzles 302, and rate at which mass is permitted to flow through valve 260 from the simulated main body of the stomach compartment of the simulated digestive system into the antrum compartment, are all amenable to computerized control.

Stage 2—The Antrum

Stage 2 of the Model provides a simulation of the antrum (the lower region of the stomach).

Thus in another aspect the invention further provides an apparatus for simulating mechanical digestion of a foodstuff, which apparatus comprises:

(a) an outer cylinder including in a first end wall an entry port through which the foodstuff can be introduced, and at the opposite second end an opening for receiving an inner cylinder, and in the side wall proximal to the first end wall an exit port from which the foodstuff can be removed, (b) an inner cylinder slidably mounted within the outer cylinder and including in a first end wall an aperture through which the foodstuff can be reversibly forced between the inner and outer cylinders, and at the opposite second end an opening for receiving a plunger, (c) a plunger slidably mounted within the inner cylinder for drawing the foodstuff through the entry port and aperture into the inner cylinder, wherein the aperture is within a resilient diaphragm secured within the end wall of the inner cylinder, and wherein the volume of the inner cylinder is between 20 and 200 ml.

Using EPI the inventors have measured the breakdown forces experienced by the food bolus within the antrum and the frequency of antral contractions. Within Stage 2 they have simulated this region of high shear, mimicking both the rate and strength of contractions experienced by the food bolus in vivo.

Stage 2 in this aspect of the invention comprises a system of nested cylinders, which permits dead-spaces between Stages 1 and 2 and optionally Stage 3 to be minimised. The aperture in the inner cylinder through which the foodstuff can be reversibly forced creates a shearing force. Preferably it is present within a resilient diaphragm secured within the end wall of the inner cylinder—for example consisting of a flat polyurethane rubber 'ring' sealably mounted at or near the terminus of the inner cylinder (e.g. of diameter 25 to 40 mm e.g. 30 or 32 mm), and incorporating an orifice of between 5 and 15 mm e.g. 6, 8, or 10 mm).

The apparatus may comprise a stand having a base plate and a vertical support member, which support member provides a clamp for securing the outer cylinder and a guide through which the arm of the plunger passes for ensuring true movement of the plunger within the inner cylinder.

The outer cylinder and the second end of the inner cylinder may each comprise at least one collar, said collars having a plurality of apertures aligned between said collars and said apparatus further comprises a plurality of guide rods passing through said aligned apertures for ensuring true movement of the inner cylinder within the outer cylinder Stage 2 can be oriented vertically or horizontally. In the former case, gravitational forces help to achieve optimal sieving of the foodstuff prior to passing to Stage 3 if present, with larger pieces of sheared foodstuff material being preferentially retained in Stage 2, and in particular in the inner cylinder. Additionally a vertical orientation permits degassing of Stage 2 into Stage 1 via the valve between the two.

The removable cassette facilitates its sterilisation e.g. by autoclaving. This is particularly useful where pathogenic bacteria may have been part of the tested foodstuff.

Preferably the apparatus further comprises means for heating the foodstuff. For example the apparatus could be heated by providing a heated water jacket, which may preferably be fed by heated water from the heating system of Stage 1. Alternatively heating may be directly via a heating block. Preferably the apparatus is heated so as to maintain the processed foodstuff at a temperature of 37° C.

Accordingly, with reference to FIGS. 5A-5D, there is provided a schematic representation of one embodiment of Stage 2, the antrum 500, portion of the apparatus according to this invention. The sequence of FIGS. 5A through 5D represent one cycle, sequentially, of actions that occur in the simulated antrum. FIG. 6 represents a schematic diagram of one complete antrum cycle.

At the top end of the antrum 500, there is provided a port 510 which interlocks with the bottom end 260 of Stage 1, the main body of the simulated stomach, (comprised by 200 and 300). The port 510 is preferably valved, said valve being either manually or automatically opened or closed. Set off at 90 degrees to said port 510 is another port 520. The port 520 permits the headspace of the system to be bled, and permits for foodstuffs processed by the antrum 500 to be transmitted to the next stage, simulative of the duodenum, Stage 3, for further processing. Operationally, foodstuff processed from Stage 1, comprised by 200 and 300 is drawn into a chamber via port 510, with port 520 closed. During the first initial change of the antrum only, there will be a small amount of air contained within the antrum, which may be displaced by bubbling up through the main body of the stomach (Stage 1) (automatic de-gassing). To assist in drawing foodstuff into the antrum, a plunger 530 is drawn downward, thereby creating a volume 531 defined by a piston 532, at the head of the plunger 530, and the internal walls of a chamber 533. Said chamber, 533, sealingly mates with an external chamber 534. At the head of said chamber 533, there is provided an aperture, 535. As a result, once the plunger 530 has been drawn down to a sufficient, pre-set level, and the volume 531 has been filled with foodstuff from Stage 1, the valve 510 is closed, and the plunger 530 is locked in position. Said chamber 533 is then drawn down, forcing foodstuff from volume 531 through said aperture 535 and into volume 536, defined now by the inner walls of chamber 534, and the upper portion of said chamber 533. At maximum displacement of the chamber 533, the end wall of chamber 533 preferably remains a pre-determined distance, preferably of about 10-20 mm, from the piston 532, defining a 'dead' volume 537. This volume compensation avoids physical crushing of particles between the piston 532 and the end internal wall of the chamber 533. The chamber 533 is then raised within said chamber 534, thereby forcing foodstuff back through aperture 535, thereby recreating/refilling volume 531, while concomitantly diminishing volume 536.

By repeated strokes of chamber 533 forcing foodstuff through aperture 535, the foodstuff is subjected to sufficient shear to break the foodstuff down. When sufficiently broken down to mimic physiologic processes and foodstuff size, port 520 is opened and plunger 530 is pushed upward to urge the processed food into Stage 3 of the simulated digestion model of this invention. Preferably, the whole of the antrum contents is not displaced and the plunger stops at a pre-determined point, providing a 'dead' volume 538 between the piston 532 and chamber 533, to trap larger particles. The pre-determined point may be set by the user either before or after the main body of the stomach (stage 1) is filled and the chamber allowed to charge under gravity. The larger particles stay in the system and undergo several cycles of 'fluid shearing' as described above, until they become more easily flushed out.

Over subsequent cycles, the 'recharging' plunger stroke is preferably the same as the initial charging stroke, and a fixed amount of material is therefore retained in the antrum on each charge. The stroke length of the plunger and of the chamber may therefore advantageously remain constant throughout the processing of the sample and no further user inputs are required.

It will be appreciated that each of the steps and components described above may be accomplished manually. Thus, at the appropriate junctures, the plunger 530 may be manually drawn down, after manually closing port 520 and opening port 510. Chamber 533 may be manually moved up and down for as many cycles as necessary to achieve the breakdown of foodstuffs to desired degree of particle size reduction. Alternatively, and preferably, all of these actions may be automated. The plunger 530 and chamber 533 may be driven by means including, but not limited to, motors, pneumatic or hydraulic means. In some preferred embodiments, when used in conjunction with the first stage apparatus (main body of the stomach) described above, the stepper motor used in the 'massaging' step in the first stage may be suitable for incorporation into the present second stage apparatus.

Preferably the driving means provides flexibility in the movement of the plunger and chamber and is suitable for use with the control systems described herein. Preferably the driving means of the plunger 530 includes a spring 539 with fixed travel: this allows for changes in the volume of the cylinder caused by displacement of the inner chamber 533 to be compensated. Preferably the plunger and the chamber are each able to move at between 5-50 mm/second. Valves may be solenoids which are programmed to open or close at the right time in relation to the other actions in the system. Preferably the valves (510, 520) are computer controlled (open or shut), have minimal dead volume and are acid and surfactant resistant.

Figure 5E:
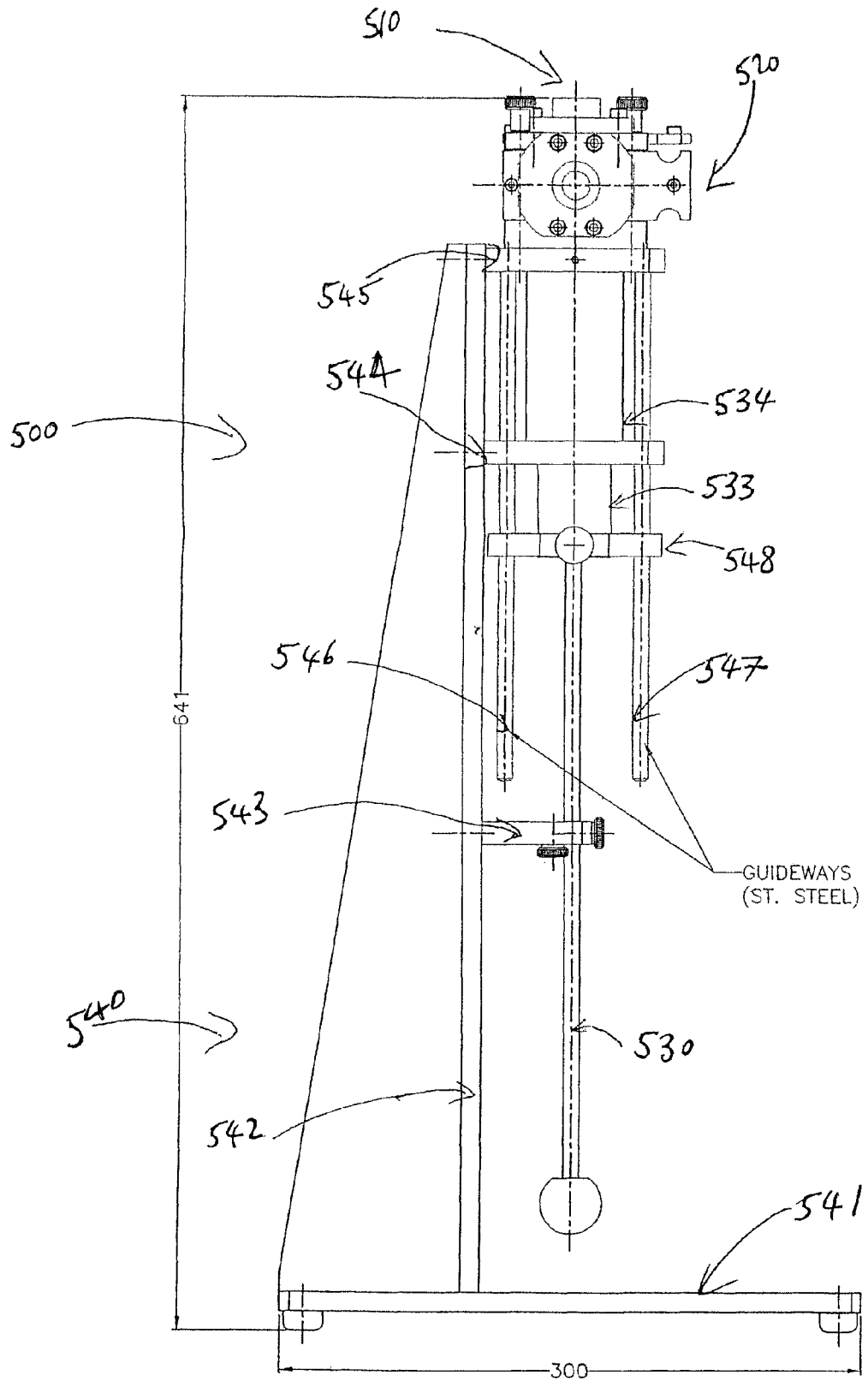
Figure 6:
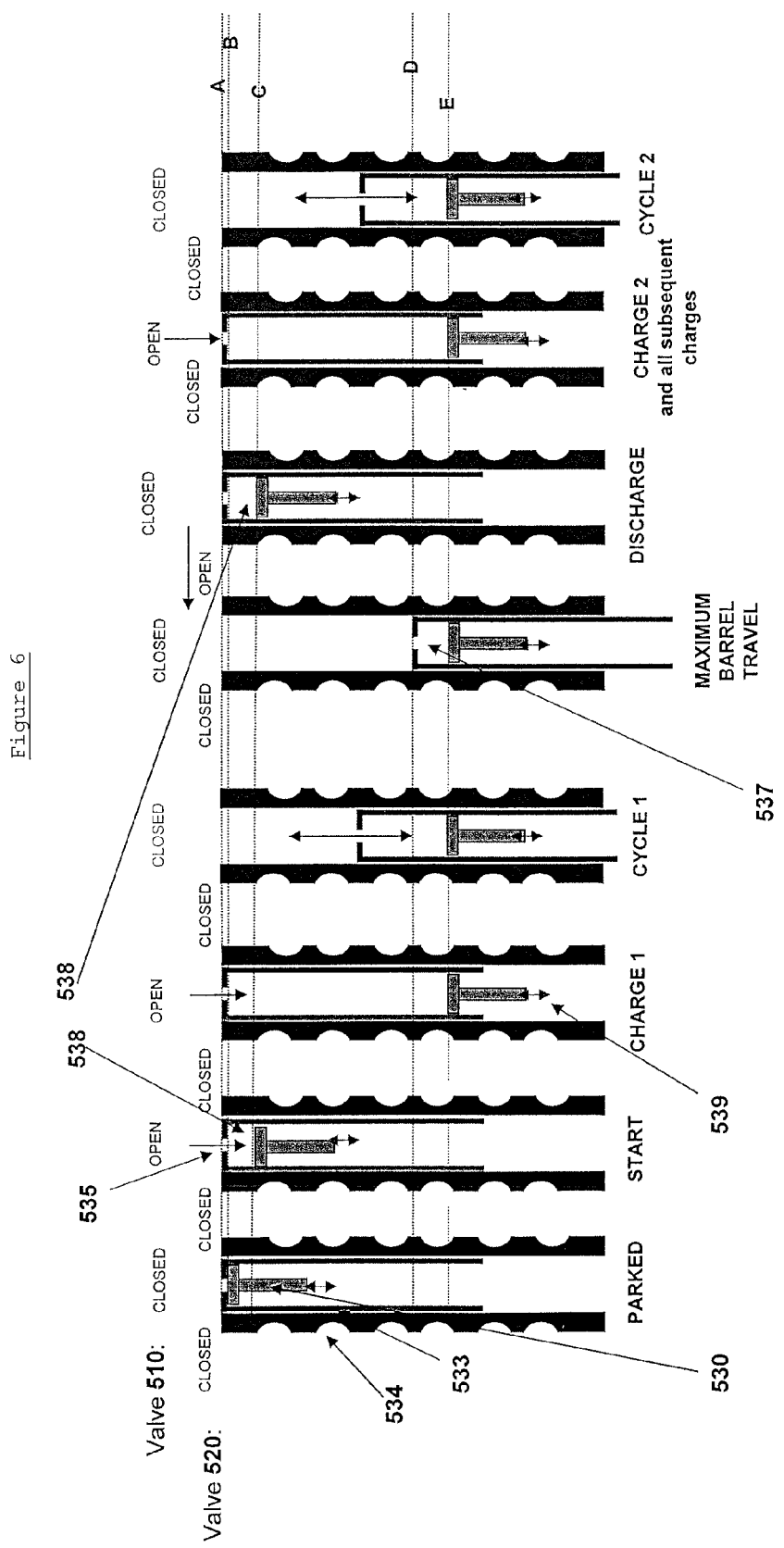

With respect to this embodiment of the antrum, reference is made to FIG. 5E, in which there is provided not only the operative components as described above, there is also provided a stand 540 comprising a base plate 541 and a vertical support member 542. Affixed to said vertical support member 542 there is provided a lockable guide 543 which ensures straight and true movement of said plunger 530. Also affixed to said vertical support member 542 are two additional guides, 544 and 545. Running through guides 544 and 545 are rods 546 and 547 which also run through an horizontal member 548 by means of which said chamber 533 is moved up and down to breakdown foodstuff, as described above. Said guides 544 and 545 also provide a means by which the entire antrum 500 is oriented in mating contact with the lower portion of the main body of the stomach, at point 260 as described herein-above.

The materials used for the construction of the apparatus are preferably resistant to acid (pH 2.0), biological surfactants (phospholipids, bile salts, fatty acids, amphilic proteins etc) and are also preferably resistant to degradation by standard cleaning detergents.

Preferably the design of the apparatus allows easy disassembly for cleaning or replacement of parts. The end plate of the chamber is preferably interchangeable to provide various sized holes to suit differing mechanical requirements. The Stage 2 (antrum) apparatus is preferably suitable for mounting directly beneath the base plate of Stage 1 (main body of the stomach) of the apparatus, to reduce the dead volume between the two stages to a minimum.

Figure 7:
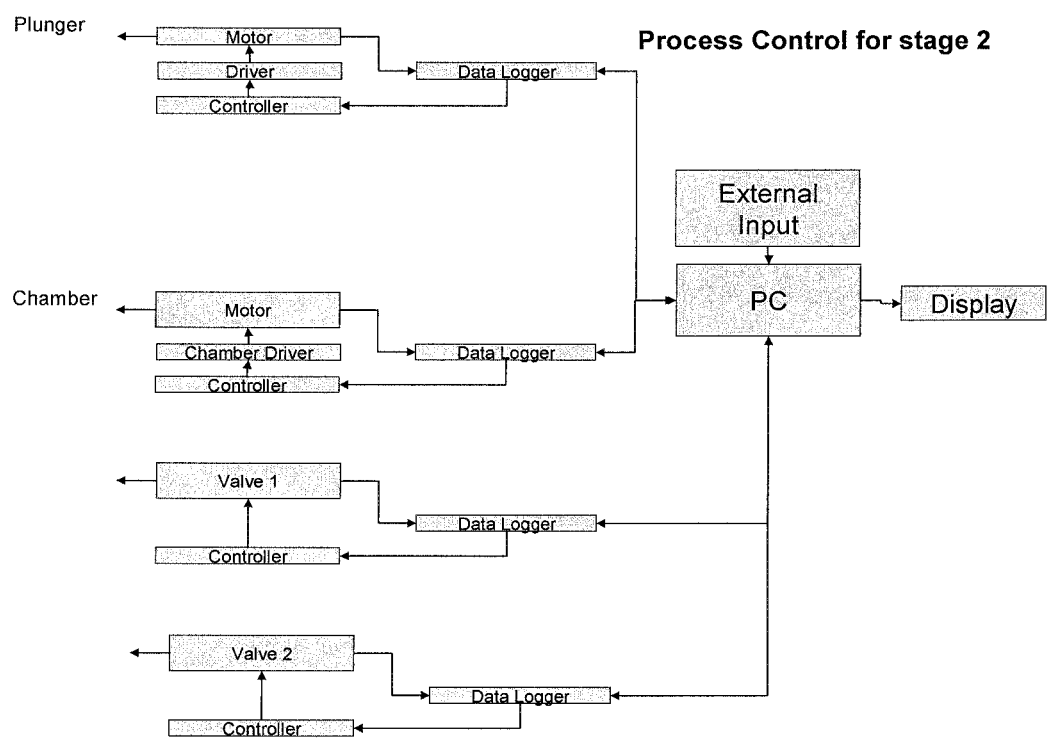

The movement of the plunger and of the chamber may preferably be monitored and controlled by a control system, preferably a computer controlled system, as shown in FIG. 7.

Stage 3—Duodenum, Intestines, Nutrient Absorption and Excretion

Having described in some detail the processing of foodstuffs according to this invention, through Stage 1 (the main body of the stomach) and Stage 2 (the antrum), duodenal and intestinal processing, nutrient absorption and finally excretion may then optionally be studied. These functions are achieved by purpose-built elements that interface with the above described Stages 1 and 2 of the present invention. When incorporated, such further components would come within the scope of the present invention, and may take the form, for example, of the system of U.S. Pat. No. 6,022,733, issued on Feb. 8, 2000, which relates to a "Simulated Biological Dissolution and Absorption System". That system includes a cell monolayer in contact with a medium in which pharmaceutical formulations may be dissolved, and analyzed, including in an effluent from said cell monolayer, to permit analysis of uptake of the dissolved pharmaceutical composition. Such a system may optionally be juxtaposed distal to Stages 1 and 2 of the present invention. Likewise for the system of U.S. Pat. No. 6,379,619, issued Apr. 30, 2002, which relates to an "Artificial Gut", which includes a series of hollow fibers lined with selected biological components, including enterocytes, wherein perfusing the series of hollow fibers thus coated with biological components occurs, including under oxygenation. In the event such a system is incorporated distal to Stages 1 and 2 of the present invention, a filtration system is incorporated to ensure that fouling and blockage of the fibers does not ensue.

Systems

In a further aspect of the present invention there is provided a system for simulating digestion of a foodstuff, which system comprises a first stage having:

(a) an outer containment vessel into which fluid can be introduced and removed via at least one orifice, and (b) an inner digestion chamber comprising a rigid portion through which the foodstuff can be introduced and a flexible portion having an aperture from which the foodstuff can be removed wherein said inner chamber is securable within the outer vessel such that reversible alteration of fluid pressure within the outer vessel causes reversible partial compression of the flexible portion for inhomogeneously mixing foodstuff present therein, wherein the apparatus further comprises a second stage connected to said first stage, the second stage comprising means for mechanically shearing foodstuff introduced from the inner digestion chamber of the first stage, and wherein the apparatus optionally further comprises a third stage connected to said second stage, the third sage comprising means for preferential absorption of material from the foodstuff removed from the second stage.

Preferably the first and second stages are connected via a valve for controlling flow between the first and second stages.

Preferably the means for mechanically shearing foodstuff comprise:

(a) an outer cylinder including in a first end wall an entry port through which the foodstuff can be introduced from the inner digestions chamber of the first stage, and at the opposite second end an opening for receiving an inner cylinder, and in the side wall adjacent the first end wall an exit port from which the foodstuff can be removed, (b) an inner cylinder slidably mounted within the outer cylinder and including in a first end wall an aperture through which the foodstuff can be reversibly forced between the inner and outer cylinders, and at the opposite second end an opening for receiving a plunger, (c) a plunger slidably mounted within the inner cylinder for drawing the foodstuff through the entry port and aperture into the inner cylinder.

Most preferably the first stage and second stage are Stage 1 and Stage 2 respectively as described in the preceding aspects. Preferably these stages are integrated and function as a synchronised unit.

In preferred embodiments of the systems of the invention control systems are present. The following factors are among those which may be controlled:
(i) synchronisation of the plunger and the chamber movement in the second stage
(ii) sequencing of inlet and outlet valves
(iii) volume measurement and 'dead volume' in the second stage
(iv) internal temperature in the system
(v) pH calibration Other factors may also be controlled, as described in more detail below.

As noted hereinabove, the apparatus and systems of the present invention are particularly susceptible to automation. Thus a system of the present invention may comprise:
(a) additive controlling means for introduction of acid or alkali additives from respective additive reservoirs into the first stage, and
(b) a central processing unit (CPU), which processor is able to:
(i) input pH values from pH electrodes disposed within the inner chamber,
(ii) compare the pH values inputs with a predetermined value
(iii) provide a control signal to said additive controlling means in accordance with the result of the comparison at (ii).

The means for introduction of digestive additives may be a peristaltic pump which acts on a flexible hose connecting the storage reservoir to the applicator In another embodiment the system comprises:
(a) temperature controlling means for adjusting the temperature of fluid introduced into the outer vessel, and
(b) a CPU, which processor is able to:
(i) input temperature values from a temperature sensor within the outer vessel,
(ii) compare the temperature values with a predetermined value
(iii) provide a control signal to said temperature controlling means in accordance with the result of the comparison at (ii).

The system may comprise:
(a) pumping means for introduction and removal of fluid from the outer vessel such as to alter the fluid pressure therein,
(b) a central processing unit (CPU), which processor is able to provide a control signal to said pumping means in accordance with predetermined values relating to preferred volume and flow rate of the fluid introduced and removed from the outer vessel.

The predetermined values may be calculated by the CPU on the basis of values corresponding to the physical and\or biochemical composition of the foodstuff input to the CPU by a user.

The pumping means for introduction and removal of fluid from the outer vessel may be a pneumatic actuator and a stepper motor to drive the actuator.

The system may comprise a CPU which is able to provide a control signal to valves controlling any one or more of:
(i) introduction of foodstuff into the first stage,
(ii) batch delivery of foodstuff from the first stage to the second stage, or
(iii) batch delivery of foodstuff from the second stage to the optional third stage The system may comprise a CPU which is able to provide a control signal to means driving the plunger and chamber in the antrum (second stage), for controlling any of the following:
(i) the level at which the plunger is locked after charging the apparatus
(ii) the maximum displacement of the chamber (defining the first 'dead volume')
(iii) the point at which the plunger stops during discharge (defining the second 'dead volume')
(iv) the number of strokes of the chamber in each shearing cycle and the number of shearing cycles
(v) the rate of movement of the chamber and/or of the plunger
(vi) the delay between each emptying and filling cycle.

The level and position of the plunger and chamber in steps (i), (ii) and/or (iii) above may be pre-determined by the user and inputted to the CPU. This sets the 'dead volume' and can be done either before or after the main body of the stomach is filled. Preferably the user input is locked to prohibit entry of values which would cause the end of the plunger and the end of the chamber to collide.

Any of the CPUs mentioned above may form part of a computing device, for example a standard personal computer (PC), which may additionally comprise other known components such as a keyboard, monitor, operating system, system memory, memory storage devices, cache memory, data backup unit, GUI controller and input-output controllers, all of which typically communicate in accordance with known techniques such as via a system bus. As will be understood by one skilled in the relevant art, there are many possible configurations of these components, and many further optional components may also be present.

User input of the variables described above for Stage 1 and Stage 2 of the apparatus, to the CPU may preferably be via a graphical user interface (GUI). The graphical user interface controller may comprise any software program capable of providing graphical input and output interfaces between the computer/CPU and a user, and for processing inputs from the user. As is well known in the relevant art, a user may provide input information using a GUI by selecting, pointing, typing, speaking, and/or otherwise operating or providing information into one or more input devices in a known manner.

Figure 8:
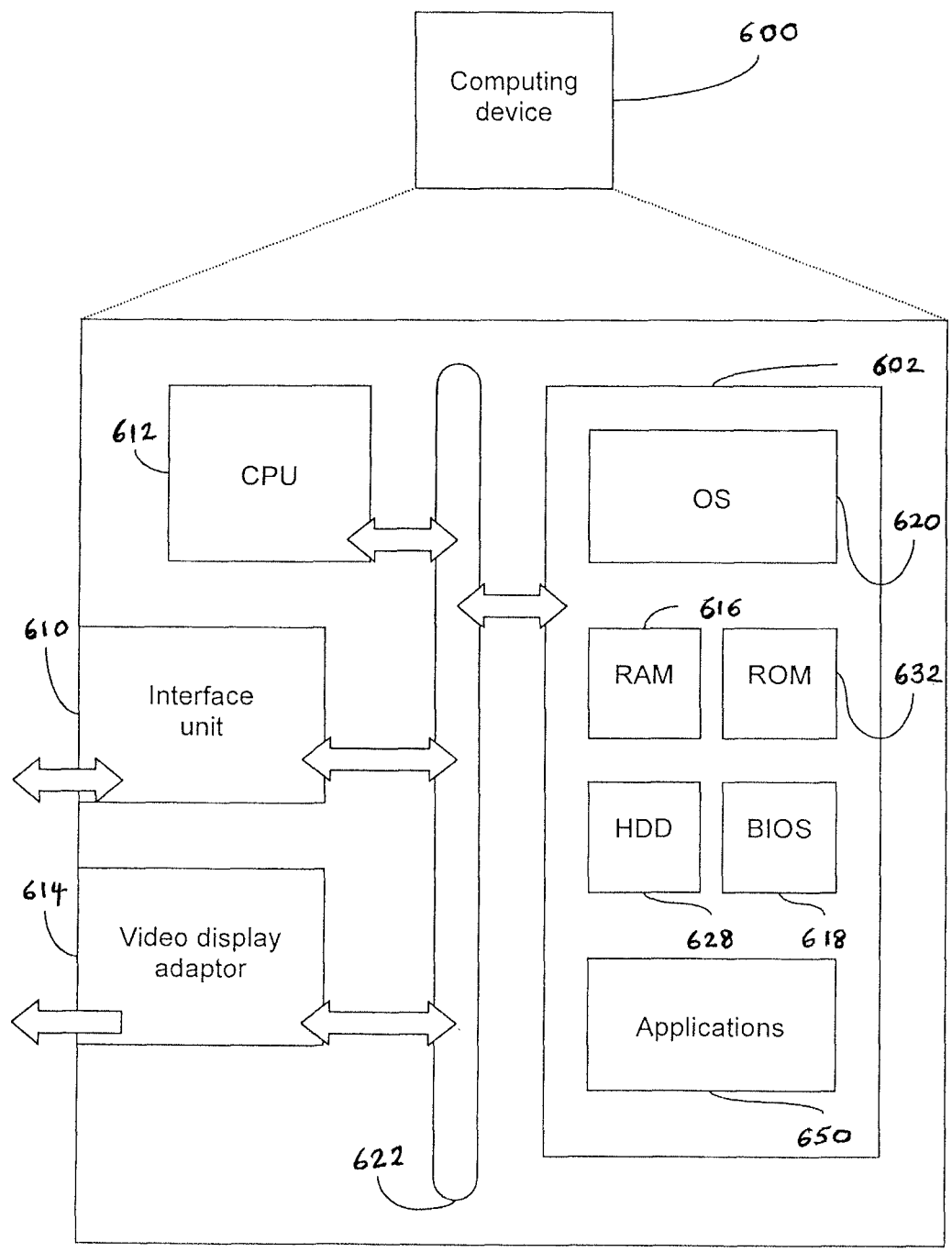

FIG. 8 shows a computing device that is suitable for use in the invention. Computing device 600 may include many more components than those shown. The components shown, however, are sufficient to disclose an illustrative embodiment for practicing the invention.

Computing device 600 includes processing unit (CPU) 612, video display adapter 614, and a mass memory 602, all in communication with each other via bus 622. The mass memory generally includes RAM 616, ROM 632, and one or more permanent mass storage devices, such as hard disk drive 628, tape drive, optical drive, and/or floppy disk drive. The mass memory stores operating system 620 for controlling the operation of computing device 600. Any general-purpose operating system may be employed. Basic input/output system ("BIOS") 618 is also provided for controlling the low-level operation of network device 600. As illustrated in FIG. 8, computing device 600 can communicate with other devices e.g. using a communications network, via interface unit 610. Interface unit 610 can be constructed for use with various communication protocols e.g. the TCP/IP protocol. Interface unit 610 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 650 are loaded into mass memory and run on operating system 620. Applications 650 may include computer executable instructions which, when executed by computing device 600, transmit, receive, and/or otherwise process data and/or enable communication with another device.

Figure 9:
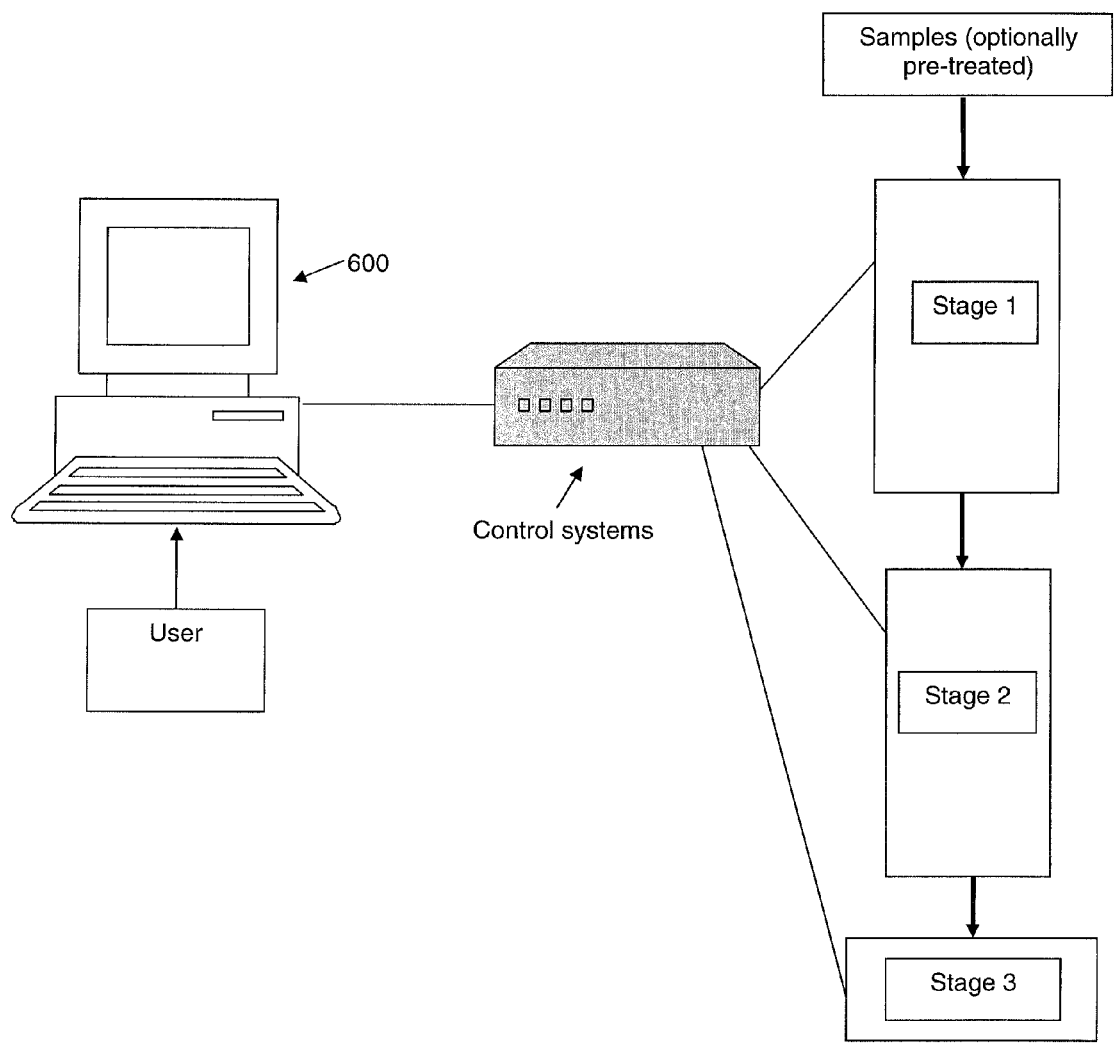

A typical operating environment is shown in FIG. 9.

The CPUs may be the same or different. Preferably the control systems of the first stage, second stage and third stage may be integrated with each other to provide an overall control system.

As noted above, the system may further comprise a pre-first stage apparatus for cutting the foodstuff into portions having desired dimensions and optionally exposing it to one or more digestive enzymes Methods of Use The invention further provides use of any of the above described apparatus or systems for modelling digestions e.g. for modelling any one or more of: the digestibility of the foodstuff; the release or presence of an active agent from the foodstuff; the interactions of dietary components of the foodstuff; the survival of an organism within the foodstuff. Such methods find utility in food safety, oral drug development, novel, functional, and specialist food characterisation, screening of active components, food structure studies etc.

A typical method may comprise:
(a) providing an apparatus or system as described above,
(b) providing the foodstuff in portions having desired dimensions,
(c) optionally incubating the portions with α-amylase and\or mucins,
(d) introducing the portions into the inner chamber,
(e) introducing known amounts of digestive additives into the inner chamber,
(f) inhomogeneously mixing the foodstuffs by cyclically introducing and removing fluid such as to squeeze and relax the flexible portion of the inner chamber while maintaining preferred temperature, pH and enzymatic composition of the foodstuff.

Preferably the method comprises:
(a) providing the apparatus or system,
(i) introducing a preferred volume of foodstuff into the inner cylinder by drawing down the plunger
(ii) withdrawing the inner cylinder such as to force foodstuff through the aperture of the inner cylinder into the outer cylinder,
(iii) depressing the inner cylinder thereby forcing foodstuff back through aperture from the outer cylinder into the inner cylinder.
(iv) optionally repeating steps (ii) to (iii) for as many cycles as necessary to achieve the breakdown of foodstuffs to desired degree of particle size reduction,
(v) removing a preferred volume of foodstuff from the exit port, which volume is optionally less than the volume of foodstuff introduced in step (I)
(vi) optionally repeating steps (i) to (v).

As noted above, the foodstuff may be sampled from the inner chamber and/or inner cylinder at intervals (in real time) to assess its composition and\or state of digestion.

Having generally described this invention with respect to its mode of operation, (including its best mode), those skilled in the art are provided the following exemplary disclosure to ensure that they are fully enabled to practice this invention, and that the written description thereof is fully adequate so as to advise those wishing to practice this invention of its many advantages. However, it should be understood that this invention is not limited in its scope to the specifics of this exemplary support. Reference is made for this purpose to the claims appended to this invention disclosure, including the equivalents thereof, as a definition of the scope of this invention.

The disclosure of all references cited herein, inasmuch as it may be used by those skilled in the art to carry out the invention, is hereby specifically incorporated herein by cross-reference.

FIGURES

Figure 1B:
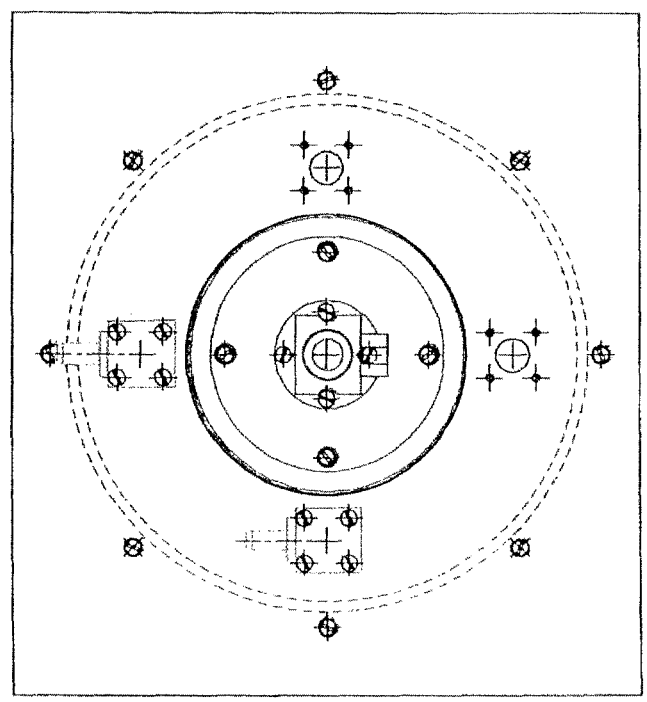
Figure 1C:
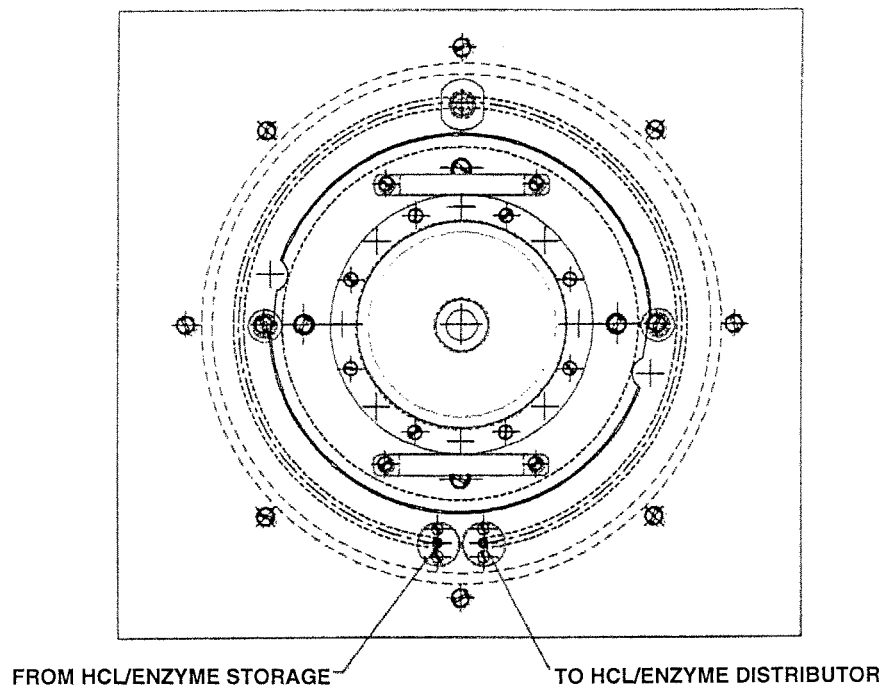
Figure 1D:
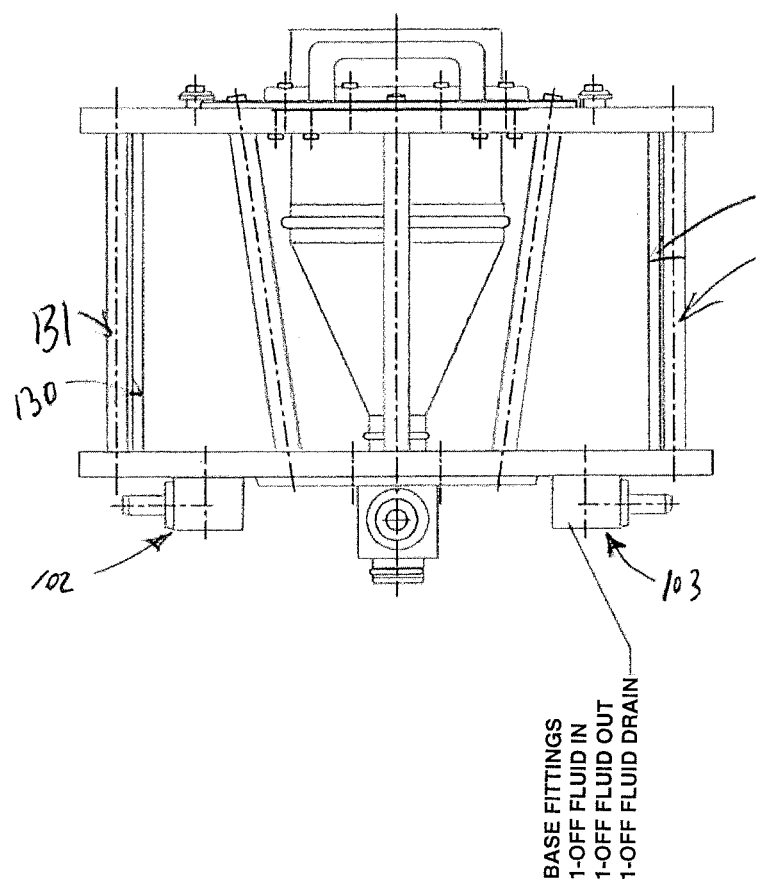

FIG. 1A provides a cross-sectional view of a first embodiment of Stage one, the main stomach body portion of the simulated digestive tract of this invention; FIG. 1B provides a bottom view. FIG. 1C provides a top view and FIG. 1D provides a second cross-sectional view rotated ninety degrees with respect to the FIG. 1A view.

Figure 2A:
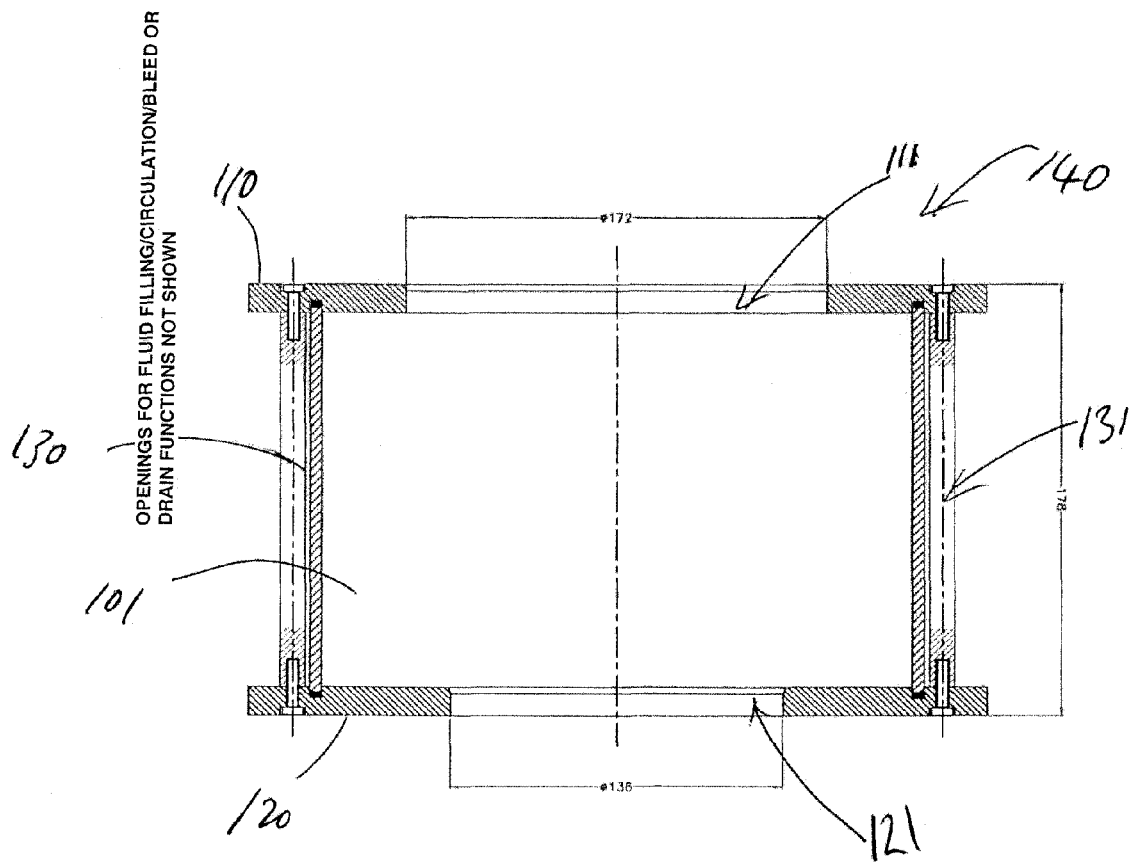
Figure 2B:
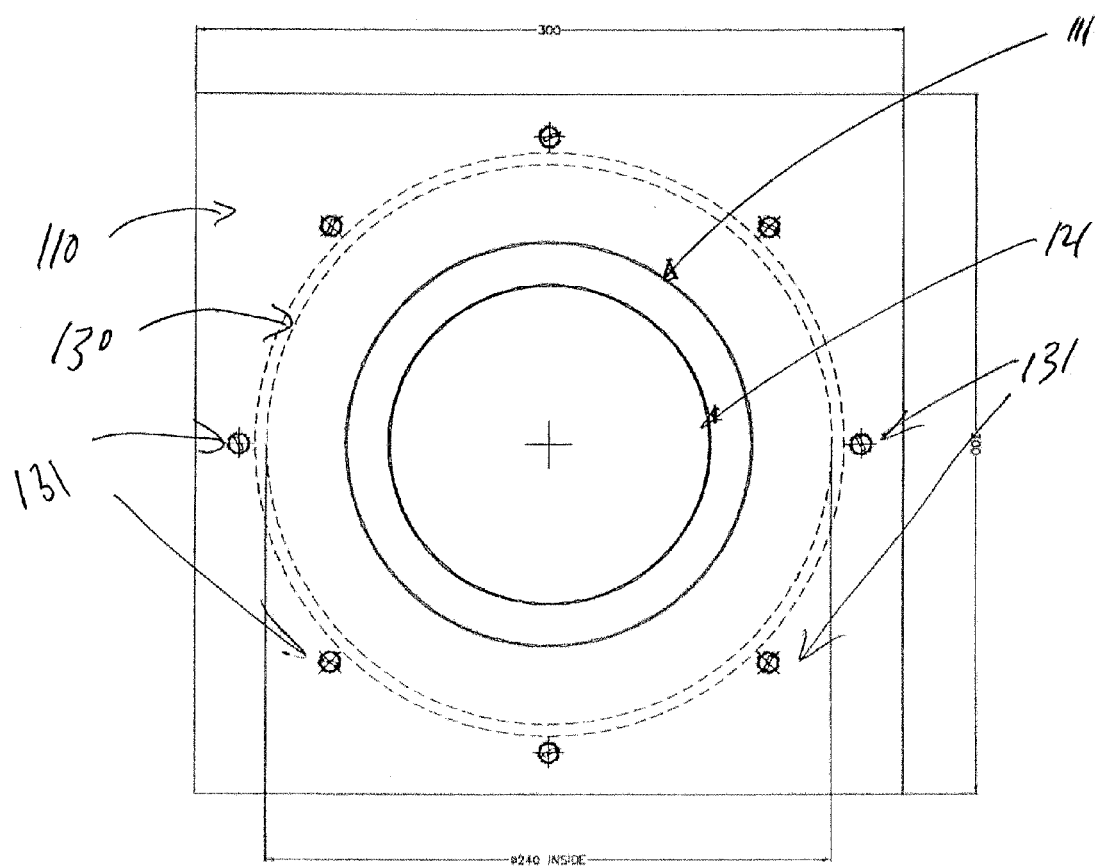

FIG. 2A provides a cross-sectional view of the containment vessel of the body of the stomach, while FIG. 2B provides a top view of the chamber.

Figure 3A:
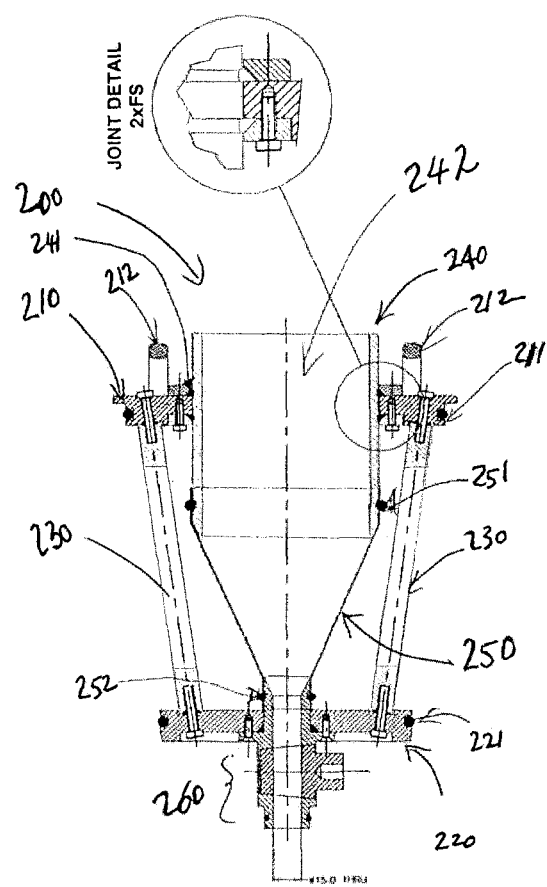
Figure 3B:
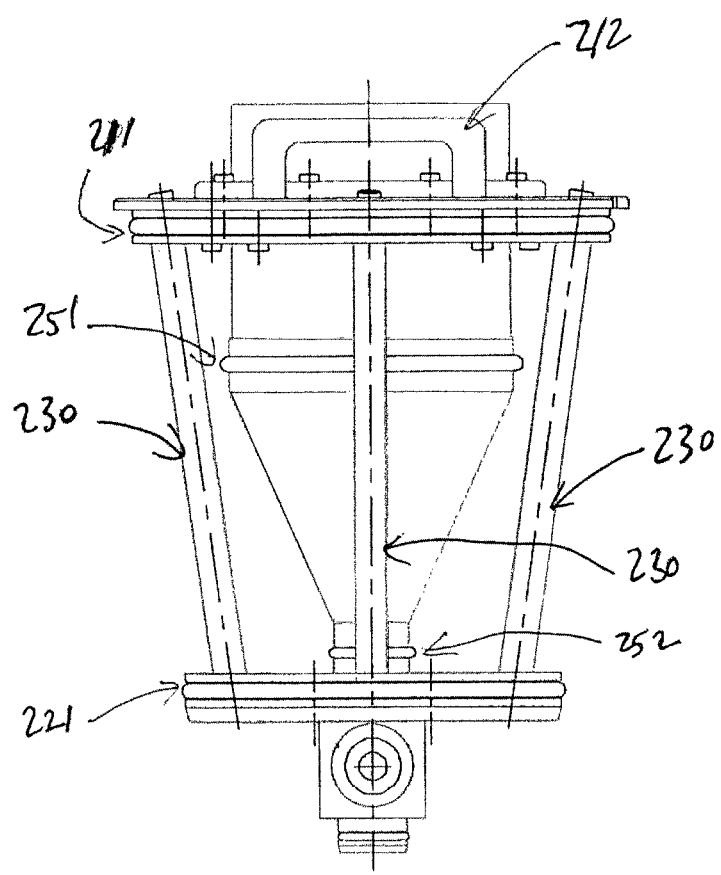
Figure 4A:
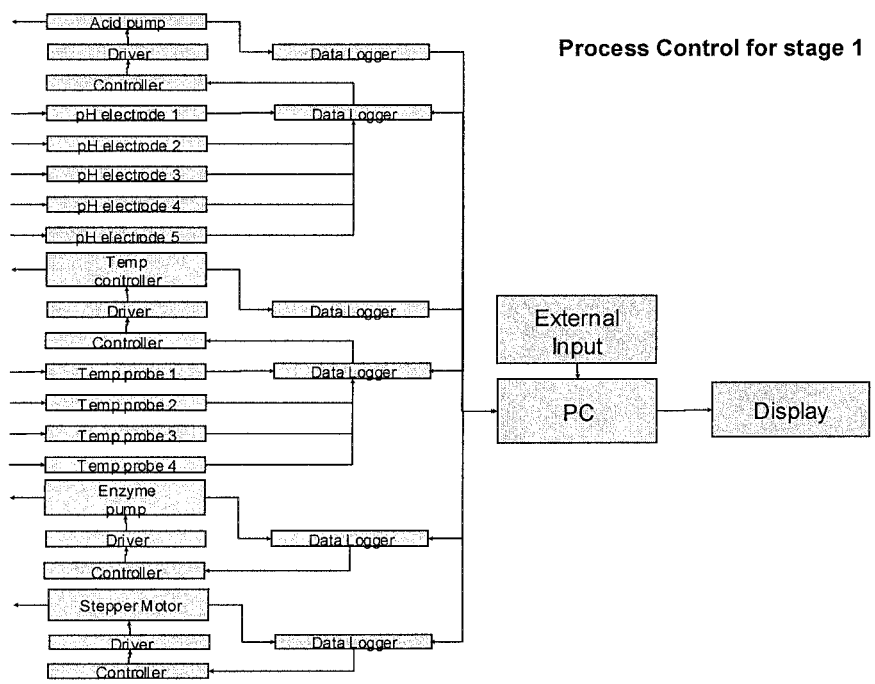
Figure 4B:
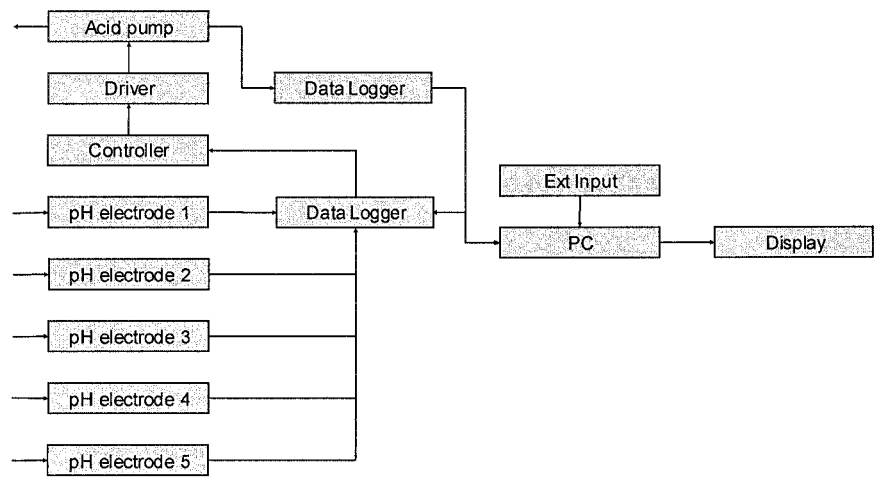
Figure 4C:
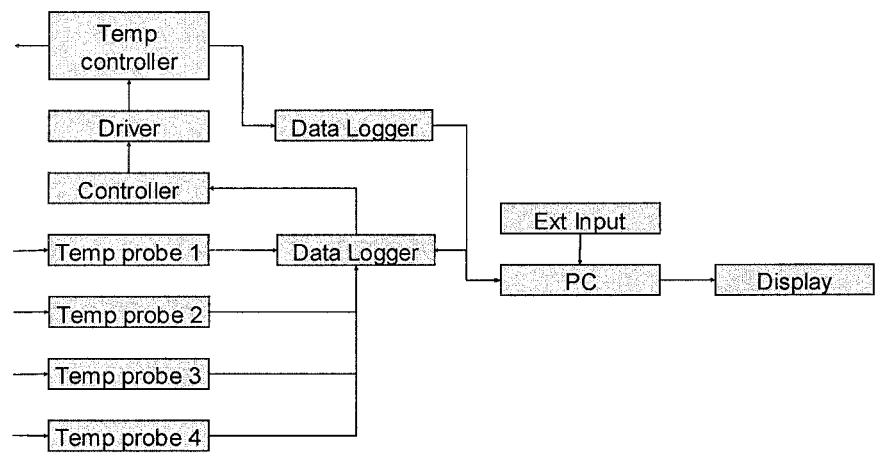
Figure 4D:
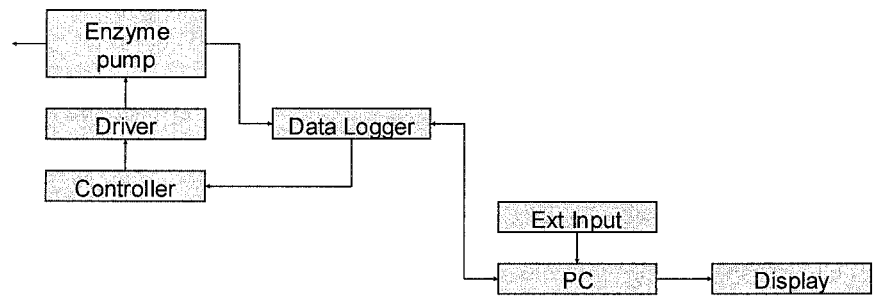
Figure 4E:
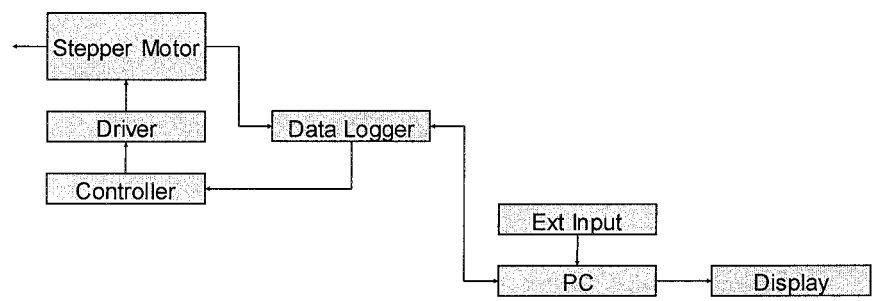

FIG. 3A provides a detailed cross-sectional view of the stomach cassette; FIG. 3B provides an external side view of the stomach cassette.

FIG. 4A-E provides detailed logic block diagrams of the software/hardware control systems for Stage 1.

FIG. 5A-E provide schematic representations of Stage 2, the antrum, of the invention.

FIG. 6 provides a representation of the stages of the charging, shearing and discharging cycle of the antrum, the second stage of the apparatus of the invention. Dead volume (piston B-C) and fill volume (piston C-E) can be used to set point (D) to maintain dead volume at maximum barrel movement.

The closing of the fill valve (RED) may be optional to allow 'reflux' into the main body of the stomach (stage 1) i.e. the opening and closing of the fill valve can be synchronised with the cycle or not, as needed. Additionally, if fill valve is open during the 'homogenisation' cycle then 'reflux' can accommodate volume changes due to the displacement of the barrel.

FIG. 7 provides a logic block diagram of the software/hardware control systems for Stage 2.

FIG. 8 provides a schematic representation of a computing device suitable for use in the control systems of the invention.

FIG. 9 provides a representation of a typical operating environment.

EXAMPLES

Example 1

Validation of Hydration, Mixing and Emptying Profiles of Gastric Additions within Stage 1 of The Model Model meals (solutions of locust bean gum (LBG) in water of varying viscosity and at 37° C.) were subjected to simulated gastric processing within Stage 1 of The Model and data on hydration, diffusion rates of gastric secretions containing visible dyes and subsequent emptying profiles were measured and compared to data collected from previous in viva studies.

Example 2

Validation of Overall Function of Stage 1

Echo-planar magnetic resonance imaging (EPI) of the Model to assess mixing dynamics and hydration profiles of meals during processing. Stage 1 has been constructed entirely out of materials that can be placed safely in the very high magnetic field of a magnetic resonance imaging (MRI) scanner. In vitro EPI utilizing the apparatus according to this invention confirms that physical handling of a test meal mirrors in vivo EPI in human volunteers using comparable, simple LBG test meals.

Example 3

Validation of Digestion of Food Material within Stage 1

Model meals containing raw and processed vegetable material are prepared. These meals are subjected to simulated digestions and samples are collected at varying time points. The resulting digestion samples are compared under microscopy to previously collected in vivo gastric aspirates of identical meals.

Example 4

Validation of Breakdown Forces Experienced in Stage 2

Agar beads of differing fracture strength were produced and fed to human volunteers during in an EPI study, enabling the measurement of the breakdown forces experienced within the antrum. The physical breakdown forces thus measured are incorporated into the antrum portion of the model according to this invention. The same protocols are used to validate the shear experienced within the simulated antrum (Stage 2 of the model).

Example 5

Validation of Mixing and Homogenisation in Stages 1+2

The physical behaviour of high fat meals, as observed in vivo using EPI and naso-gastric aspiration of digesta is replicated in the model system of this invention. The amount and spatial distribution of fat within the gastric lumen are critical factors influencing delivery to the small intestines. In vivo (human), two emulsion meals were produced that were of similar physical characteristics but showed very different behaviour within the stomach, resulting in different gastric emptying profiles. The same emulsion meals are produced and used in the validation of lipid handling within this invention.

Example 6

Validation of Model as a Whole System (Stages 1, 2+3)

The model is tested for ability to replicate the rate of digestion of allergenic proteins from peanuts and milk and the creation of similar patterns of protein fragmentation as found in gastric and duodenal aspirates from in vivo studies. Meals containing either milk or peanuts are produced and fed to the whole model. Samples of both gastric and duodenal digesta are collected at the same time points as those within the in vivo study. SDS-page and microscopy of each sample are performed and protein fragment profiles are compared to those from the in vivo samples.

Example 7

Validation of the Model as a Whole System

The model is tested for ability to replicate in vivo digestibility data for carotenoids from fresh and processed fruit and vegetables collected from ileostemy patients. Here the persistence of food material within the gut lumen and the rate of particle size reduction of the food matrix by both biochemical and physical processing is assessed. From collection of digesta at various key areas within the model the stability of the gut colloidal phases is assessed and the digestion products of the major nutrients, including protein and lipid, is extracted and analysed and compared to the data collected from the in vivo human digestion studies.

The invention claimed is:

1. An apparatus for conducting physiologically relevant investigations into food and pharmaceutical digestion by vertebrates using real foods and pharmaceutical preparations, which apparatus comprises:
    (a) a vessel including an entry port through which the foodstuff can be introduced, and an exit port from which the foodstuff can be removed,
    (b) a plunger slidably mounted within the vessel for drawing the foodstuff through the entry port into the vessel to subject the foodstuff to mechanical shear forces.

2. An apparatus as claimed in claim 1, for simulating mechanical digestion of a foodstuff, wherein said vessel comprises:
    (a) an outer cylinder including in a first end wall an entry port through which the foodstuff can be introduced, and at the opposite second end an opening for receiving an inner cylinder, and in the side wall proximal to the first end wall an exit port from which the foodstuff can be removed, and
    (b) an inner cylinder slidably mounted within the outer cylinder and including in a first end wall an aperture through which the foodstuff can be reversibly forced between the inner and outer cylinders, and at the opposite second end an opening for receiving a plunger; and wherein said plunger is slidably mounted within the inner cylinder for drawing the foodstuff through the entry port and aperture into the inner cylinder.

3. An apparatus as claimed in claim 2, wherein the aperture is within a resilient diaphragm secured within the end wall of the inner cylinder.

4. An apparatus as claimed in claim 2, wherein the volume of the inner cylinder is between 20 and 200 ml.

5. An apparatus as claimed in claim 2 wherein the apparatus comprises a stand having a base plate and a vertical support member, which support member provides a clamp for securing the outer cylinder and a guide through which the arm of the plunger passes for ensuring true movement of the plunger within the inner cylinder.

6. An apparatus as claimed in claim 5 wherein the outer cylinder and the second end of the inner cylinder each comprise at least one collar, said collars having a plurality of apertures aligned between said collars and said apparatus further comprises a plurality of guide rods passing through said aligned apertures for ensuring true movement of the inner cylinder within the outer cylinder.

7. An apparatus as claimed in claim 2 wherein the outer cylinder is vertically orientated.

8. An apparatus as claimed in claim 2 wherein the apparatus further comprises means for heating the foodstuff.

9. A model gut system for physiologically relevant investigation into food and pharmaceutical digestion by vertebrates, the system comprising, in modular form:
   (i) a first stage comprising a flexible vessel into which foods and\or pharmaceutical preparations can be introduced to accurately mimic both the biochemical and physical processes of dilution and mixing of meals within the stomach; and
   (ii) a second stage which is the apparatus of claim 1.

10. A system as claimed in claim 9, wherein the flexible vessel comprises a flexible portion, which tapers to an aperture from which foodstuff is removed, such that reversible alteration of pressure impinging on said flexible portion causes reversible partial compression of said flexible portion for mixing foodstuff present therein to thereby transmit physiologically relevant shear forces to said foodstuff consistent with the processing of ingested material in the stomach of a vertebrate.

11. A system as claimed in claim 9, wherein said flexible vessel comprises a portion through which the foodstuff can be introduced and a flexible portion which tapers from the portion through which the foodstuff can be introduced to an aperture from which the foodstuff can be removed.

12. A system as claimed in claim 9 wherein the flexible vessel is an inner digestion chamber contained within a sealed outer containment vessel.

13. A system as claimed in claim 11, wherein the inner digestion chamber comprises a rigid portion through which the foodstuff can be introduced and a flexible portion which tapers from the rigid portion to an aperture from which the foodstuff can be removed.

14. A system as claimed in claim 12 where the mixing achieved is inhomogeneous mixing which is achieved by the pulsing produced by the addition and removal of fluid from the outer containment vessel.

15. An system as claimed in claim 14 wherein said inner chamber is securable within the outer vessel such that reversible alteration of fluid pressure within the outer vessel causes reversible partial compression of the flexible portion for mixing foodstuff present therein.

16. A method of simulating digestion of a foodstuff, which method comprises:
   (a) providing a system as claimed in claim 9,
   (b) providing a foodstuff in portions having desired dimensions,
   (c) introducing the portions into the inner chamber,
   (d) introducing known amounts of digestive additives into the inner chamber,
   (e) inhomogeneously mixing the foodstuffs by cyclically introducing and removing fluid such as to squeeze and relax the flexible portion of the inner chamber while maintaining preferred temperature, pH and enzymatic composition of the foodstuff.

17. A method of simulating digestion of a foodstuff, which method comprises providing an apparatus as claimed in claim 2, and
   (i) introducing a preferred volume of foodstuff into the inner cylinder by drawing down the plunger
   (ii) withdrawing the inner cylinder such as to force foodstuff through the aperture of the inner cylinder into the outer cylinder,
   (iii) depressing the inner cylinder thereby forcing foodstuff back through aperture from the outer cylinder into the inner cylinder,
   (iv) removing a preferred volume of foodstuff from the exit port, which volume is optionally less than the volume of foodstuff introduced in step (i).

18. A method as claimed in claim 16 or claim 17 wherein the foodstuff is sampled from the inner chamber and\or inner cylinder at intervals to assess its composition and\or state of digestion.

19. A method as claimed in claim 16 or 17 for modeling any one or more of: the digestibility of the foodstuff; the release or presence of an active agent from the foodstuff; the interactions of dietary components of the foodstuff; the survival of an organism within the foodstuff.

20. A method according to claim 16, wherein
   (c) the foodstuff in portions is incubated with $\alpha$-amylase and\or mucins before being introduced into the inner chamber.

21. A method according to claim 17, wherein:
   (iv) steps (ii) to (iii) are repeated for as many cycles as necessary to achieve the breakdown of foodstuffs to desired degree of particle size reduction.

22. A method according to claim 17, wherein:
   (vi) steps (i) to (v) are repeated.

23. A method of simulating digestion of a foodstuff, which method comprises providing a system as claimed in claim 9, wherein the vessel of the second stage comprises:
   (a) an outer cylinder including in a first end wall an entry port through which the foodstuff can be introduced, and at the opposite second end an opening for receiving an inner cylinder, and in the side wall proximal to the first end wall an exit port from which the foodstuff can be removed, and
   (b) an inner cylinder slidably mounted within the outer cylinder and including in a first end wall an aperture through which the foodstuff can be reversibly forced between the inner and outer cylinders, and at the opposite second end an opening for receiving a plunger; and wherein said plunger is slidably mounted within the inner cylinder for drawing the foodstuff through the entry port and aperture into the inner cylinder; and
   (i) introducing a preferred volume of foodstuff into the inner cylinder by drawing down the plunger,
   (ii) withdrawing the inner cylinder such as to force foodstuff through the aperture of the inner cylinder into the outer cylinder,
   (iii) depressing the inner cylinder thereby forcing foodstuff back through aperture from the outer cylinder into the inner cylinder,
   (v) removing a preferred volume of foodstuff from the exit port, which volume is optionally less than the volume of foodstuff introduced in step (i).

24. A method as claimed in claim 23 wherein the foodstuff is sampled from the inner chamber and\or inner cylinder at intervals to assess its composition and\or state of digestion.

25. A method as claimed in claim 23 for modeling any one or more of: the digestibility of the foodstuff; the release or presence of an active agent from the foodstuff; the interactions of dietary components of the foodstuff; the survival of an organism within the foodstuff.

26. A method according to claim 23, wherein:
(iv) steps (ii) to (iii) are repeated for as many cycles as necessary to achieve the breakdown of foodstuffs to desired degree of particle size reduction.

27. A method according to claim 23, wherein:
(vi) steps (i) to (v) are repeated.

\* \* \* \* \*